US012215010B2

(12) United States Patent
Balthazor

(10) Patent No.: US 12,215,010 B2
(45) Date of Patent: Feb. 4, 2025

(54) REAR MOUNTED LIFT FOR OVER-THE-ROAD VEHICLE

(71) Applicant: Steve Balthazor, Hays, KS (US)

(72) Inventor: Steve Balthazor, Hays, KS (US)

(*) Notice: Subject to any disclaimer, the term of this patent is extended or adjusted under 35 U.S.C. 154(b) by 515 days.

(21) Appl. No.: 17/558,902

(22) Filed: Dec. 22, 2021

(65) Prior Publication Data

US 2022/0194766 A1 Jun. 23, 2022

Related U.S. Application Data

(60) Provisional application No. 63/129,827, filed on Dec. 23, 2020.

(51) Int. Cl.
*B60P 1/02* (2006.01)
*B66F 9/075* (2006.01)

(52) U.S. Cl.
CPC .......... *B66F 9/07513* (2013.01); *B60P 1/025* (2013.01)

(58) Field of Classification Search
CPC ............................. B66F 9/07513; B60P 1/025
See application file for complete search history.

(56) References Cited

U.S. PATENT DOCUMENTS

| | | | |
|---|---|---|---|
| 2,437,806 A | 3/1948 | Dempster | |
| 2,823,813 A | 2/1958 | Shimmon | |
| 3,235,105 A | 2/1966 | Loomis | |
| 4,278,390 A | 7/1981 | Ahearn | |
| 5,391,043 A | 2/1995 | Bohata et al. | |
| 6,019,567 A * | 2/2000 | Lutkus | B60P 1/4442 414/556 |
| 6,234,741 B1 * | 5/2001 | McDaniel | B66F 9/06 254/10 R |
| 7,074,004 B2 | 7/2006 | Lockamy et al. | |
| 7,241,100 B2 | 7/2007 | Lockamy et al. | |
| 7,264,437 B2 | 9/2007 | Lockamy et al. | |
| 7,270,511 B2 | 9/2007 | Lockamy et al. | |
| 8,322,968 B1 | 12/2012 | Mizner | |
| 8,651,795 B2 | 2/2014 | Born et al. | |
| 8,747,048 B2 | 6/2014 | Born et al. | |
| 8,974,169 B2 | 3/2015 | Mizner | |
| 9,090,441 B2 | 7/2015 | Mizner | |
| 9,623,781 B2 * | 4/2017 | Denton | B60P 1/4428 |
| 10,232,757 B2 * | 3/2019 | Sawatzky | B60P 1/4414 |
| 10,370,231 B2 | 8/2019 | Bristow et al. | |
| 2004/0191038 A1 | 9/2004 | Lockamy et al. | |
| 2014/0010622 A1 | 1/2014 | Mizner | |
| 2019/0337783 A1 | 11/2019 | Bristow et al. | |

FOREIGN PATENT DOCUMENTS

CN 206615974 U 11/2017

OTHER PUBLICATIONS

PCT Search Report and Written Opinion dated Mar. 4, 2022 for related PCT Application No. PCT/US2021/064815, 18 pages.

* cited by examiner

*Primary Examiner* — Jonathan Snelting
(74) *Attorney, Agent, or Firm* — Hovey Williams LLP; Kameron D. Kelly

(57) ABSTRACT

A powered forklift assembly is configured to be operably mounted on an over-the-road vehicle to shift a load relative to a chassis of the vehicle. The powered forklift assembly includes a shiftable forklift and a vehicle bed. The shiftable forklift includes an extendable mast and a fork mechanism. The fork mechanism is attached to and is vertically shiftable relative to the mast and configured to support the load.

29 Claims, 18 Drawing Sheets

REAR MOUNTED LIFT FOR OVER-THE-ROAD VEHICLE

CROSS-REFERENCE TO RELATED APPLICATIONS

This application claims the benefit of U.S. Provisional Application Ser. No. 63/129,827, filed Dec. 23, 2020, entitled REAR MOUNTED LIFT FOR OVER-THE-ROAD VEHICLE, which is hereby incorporated in its entirety by reference herein.

BACKGROUND

1. Field

Embodiments of the present invention relate to an over-the-road vehicle and a forklift mounted as part of the vehicle.

2. Discussion of Prior Art

Pickup trucks and commercial vehicles may be configured with a bed structure for hauling various types of loads. In some embodiments, a bed structure in the form of a flatbed is mounted on the chassis of the vehicle and presents a generally flat surface for accommodating a range of load sizes and configurations. A conventional flatbed also preferably allows a load to be variously positioned along the top surface of the flatbed. In the usual manner, a separate lifting vehicle is generally operated adjacent the flatbed vehicle for precisely positioning the load along the top surface of the flatbed.

It is also known for prior art truck beds to have a lifting mechanism operably mounted on the bed to shift a load relative to the bed. For instance, in agricultural applications, a conventional truck flatbed includes a bale lifting arm that is configured to grab and lift a hay bale onto the flatbed for transport. However, prior art truck beds with lifting mechanisms have various deficiencies. For example, conventional bed lifting devices are cumbersome to operate because the shiftable lifting arm is difficult to locate and move in a precise manner. Also, the location and orientation of known lifting arms on the truck bed makes it difficult to engage a load positioned on the ground or on an elevated support structure (such as a support rack or dock).

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a vehicle with a forklift that does not suffer from the problems and limitations of prior art devices, including those set forth above.

A first aspect of the present invention concerns a powered forklift assembly configured to be operably mounted on an over-the-road vehicle to shift a load relative to a chassis of the vehicle. The powered forklift assembly broadly includes a shiftable forklift and a vehicle bed. The shiftable forklift includes an extendable mast and a fork mechanism. The fork mechanism is attached to and is vertically shiftable relative to the mast and configured to support the load. The vehicle bed supports the forklift and is configured to be mounted relative to the chassis of the vehicle, with the vehicle bed presenting a bed work surface for receiving the load. The mast is shiftably connected relative to the vehicle bed for transverse movement relative thereto along an operating path, with the forklift being shiftable along the operating path between a rear position and a forward position to transfer the load on or off of the bed work surface.

A second aspect of the present invention concerns a powered forklift assembly configured to be operably mounted on an over-the-road vehicle to shift a load relative to a chassis of the vehicle. The powered forklift assembly broadly includes a shiftable forklift and a vehicle bed. The shiftable forklift includes an extendable mast and a fork mechanism. The fork mechanism is attached to and is vertically shiftable relative to the mast and configured to support the load. The vehicle bed supports the forklift and is configured to be mounted relative to the chassis of the vehicle, with the vehicle bed presenting a bed work surface for receiving the load. The fork mechanism includes an upright backrest and a fork extending away from the backrest in a longitudinal direction. The fork is pivotally attached relative to the mast and is pivotal independently of the mast about a lateral pivot axis extending transversely to the longitudinal direction.

A third aspect of the present invention concerns a powered forklift assembly configured to be operably mounted on an over-the-road vehicle to shift a load relative to a chassis of the vehicle. The powered forklift assembly broadly includes a shiftable forklift and a vehicle bed. The shiftable forklift includes an extendable mast and a fork mechanism. The fork mechanism is attached to and is vertically shiftable relative to the mast and configured to support the load. The vehicle bed supports the forklift and is configured to be mounted relative to the chassis of the vehicle, with the vehicle bed presenting a bed work surface for receiving the load. The extendable mast includes a supporting mast assembly and a driven mast assembly operable to support the fork mechanism. The supporting mast assembly is vertically stationary relative to the vehicle bed and the driven mast assembly is vertically slidable relative to the supporting mast assembly. The driven mast assembly comprises a lowering assembly that is shiftable to a lowered position where at least part of the lifting assembly and/or at least part of the fork mechanism is located below the supporting mast assembly.

A fourth aspect of the present invention concerns a method of operating a powered forklift assembly installed as part of an over-the-road vehicle to shift a load relative to the chassis of the vehicle. The powered forklift assembly includes a shiftable forklift and a vehicle bed. The forklift includes an extendable mast and a fork mechanism having a pivotal fork. The fork mechanism is attached to and is vertically shiftable relative to the mast and configured to support the load. The vehicle bed supports the forklift and is configured to be mounted relative to the chassis of the vehicle, with the vehicle bed presenting a bed work surface for receiving the load. The mast is shiftably connected to the vehicle bed for transverse movement relative thereto along an operating path. The method broadly includes the step of shifting a forklift of the powered forklift assembly transversely along the operating path between a rear position and a forward position to transfer the load on and off of the bed work surface.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 10:
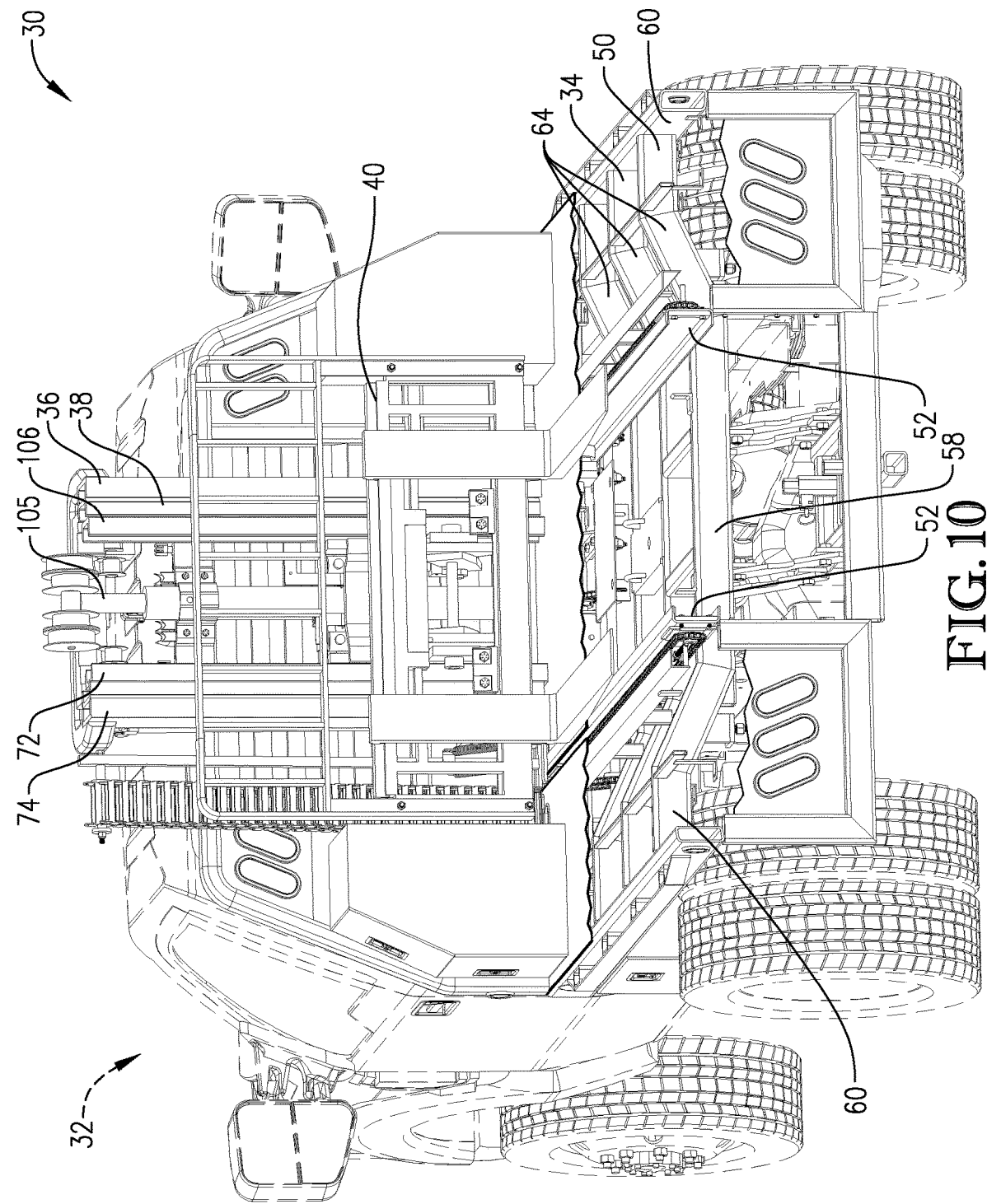
Figure 11:
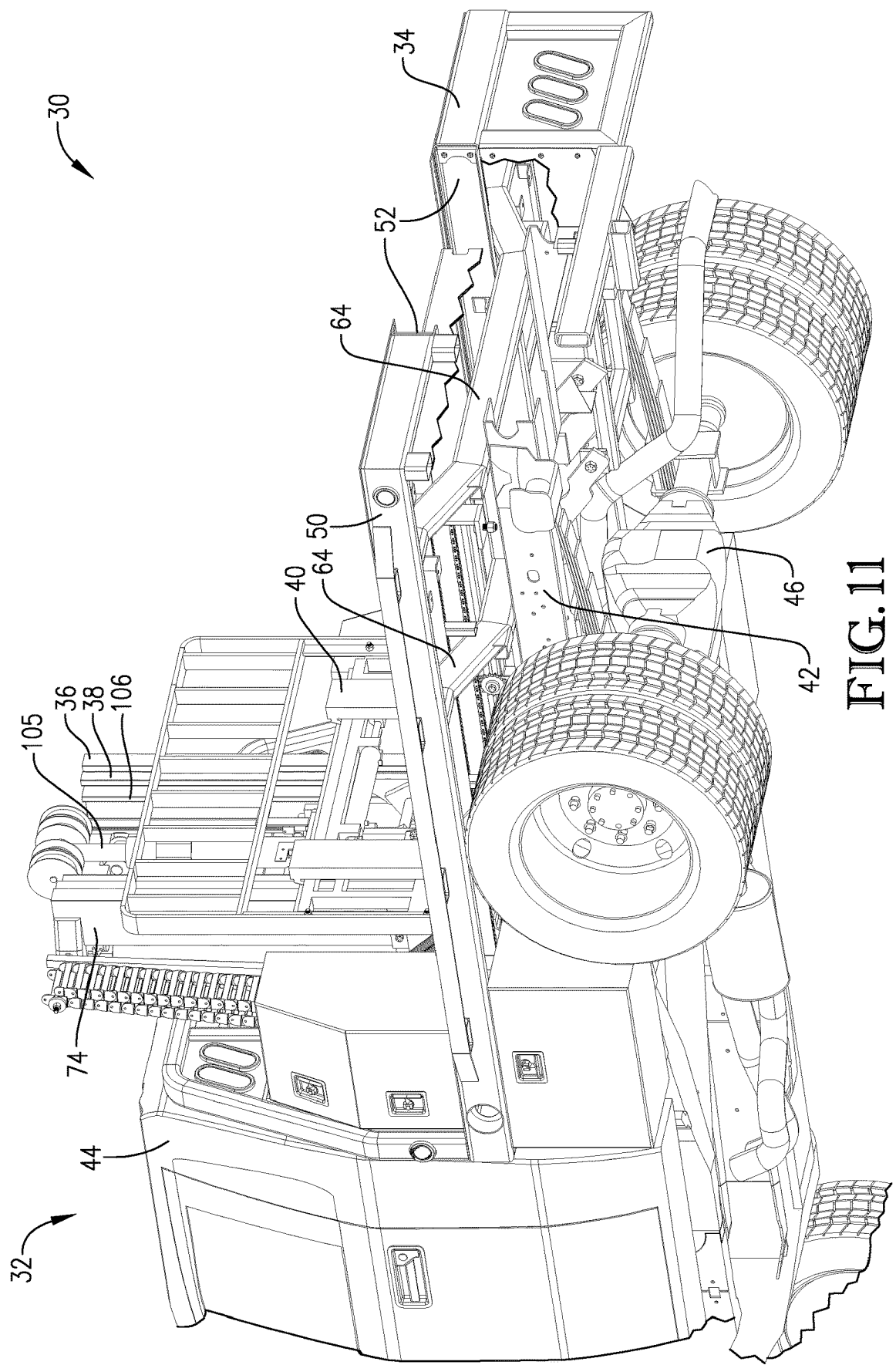
Figure 12:
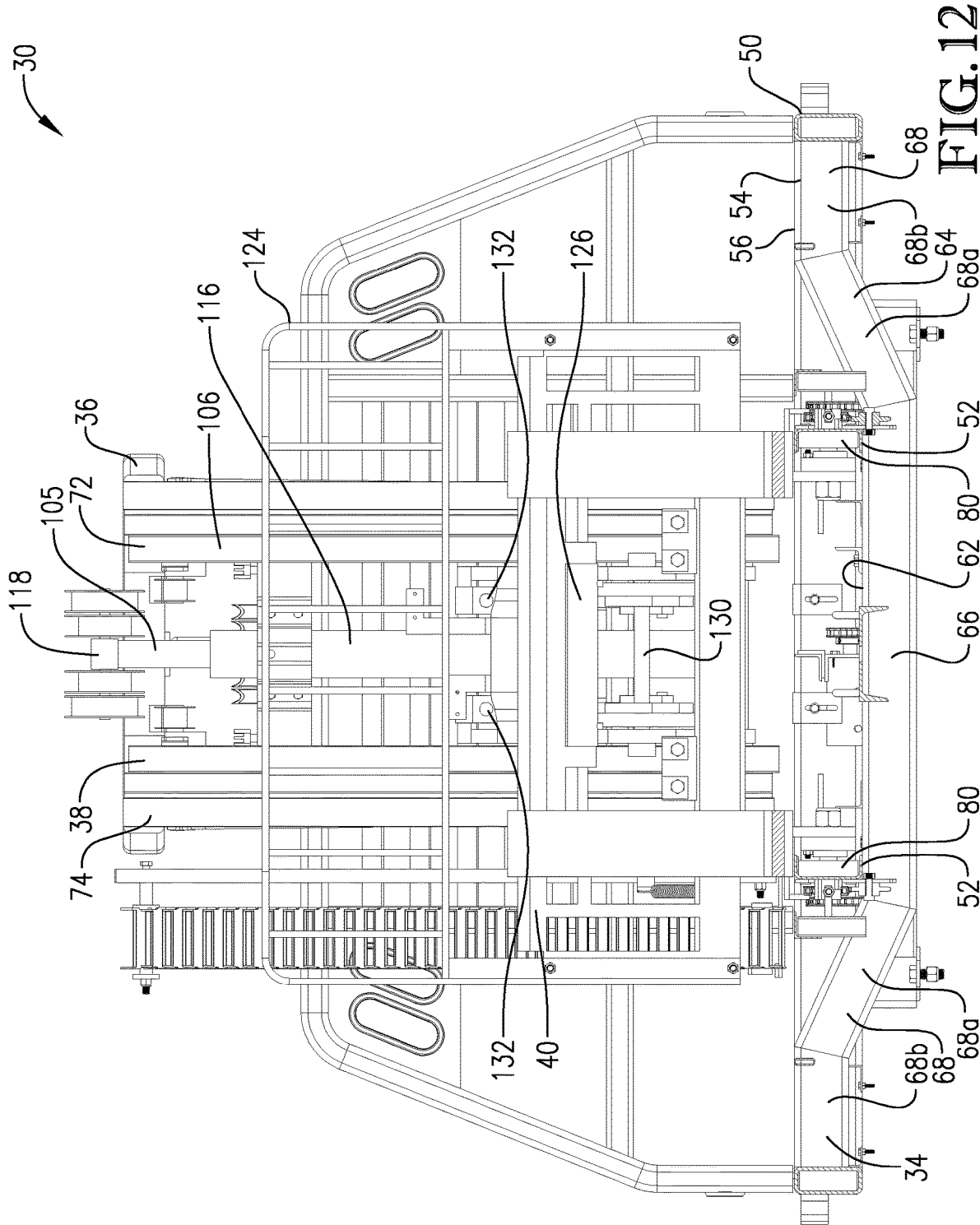
Figure 13:
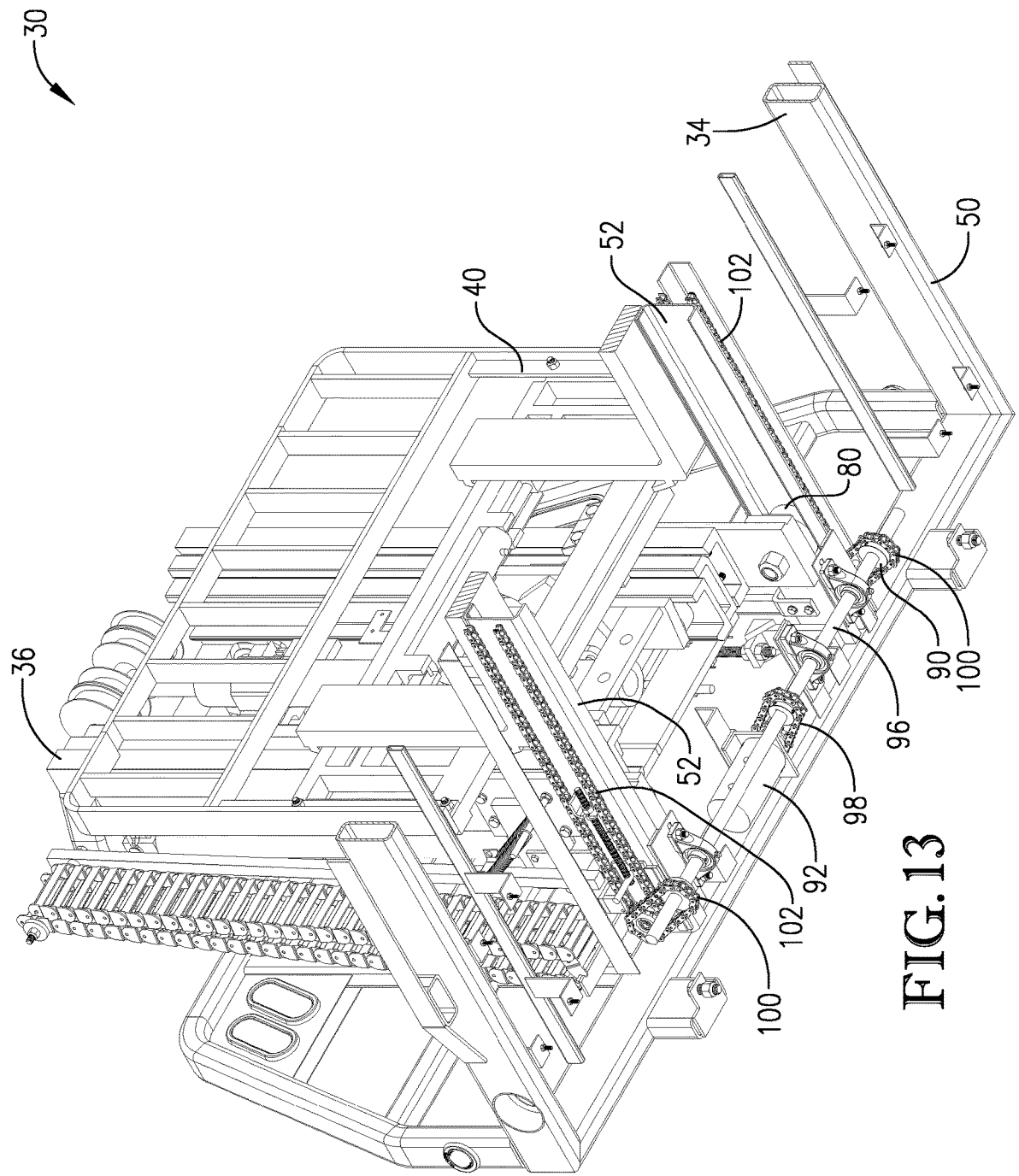
Figure 14:
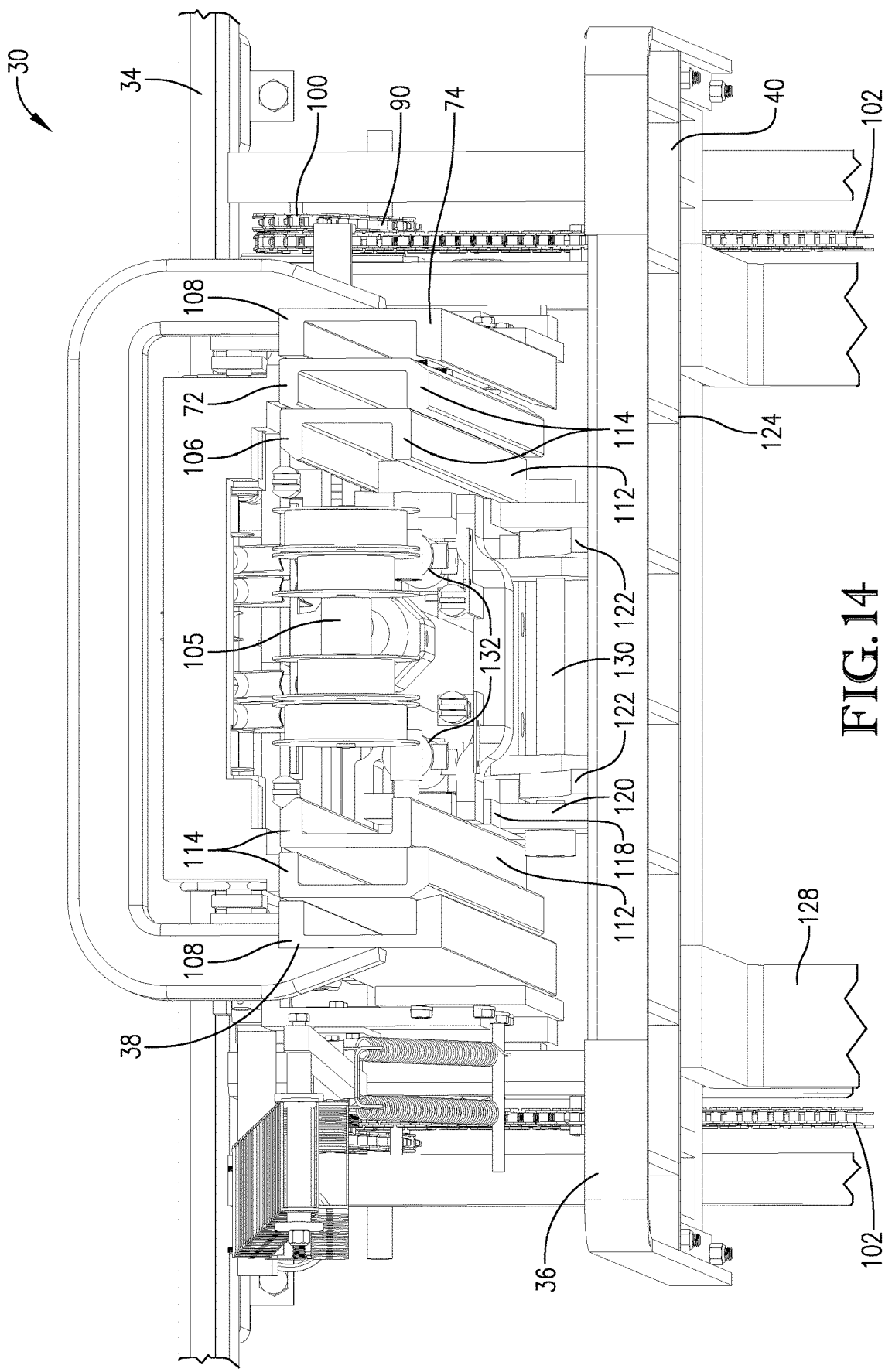
Figure 15:
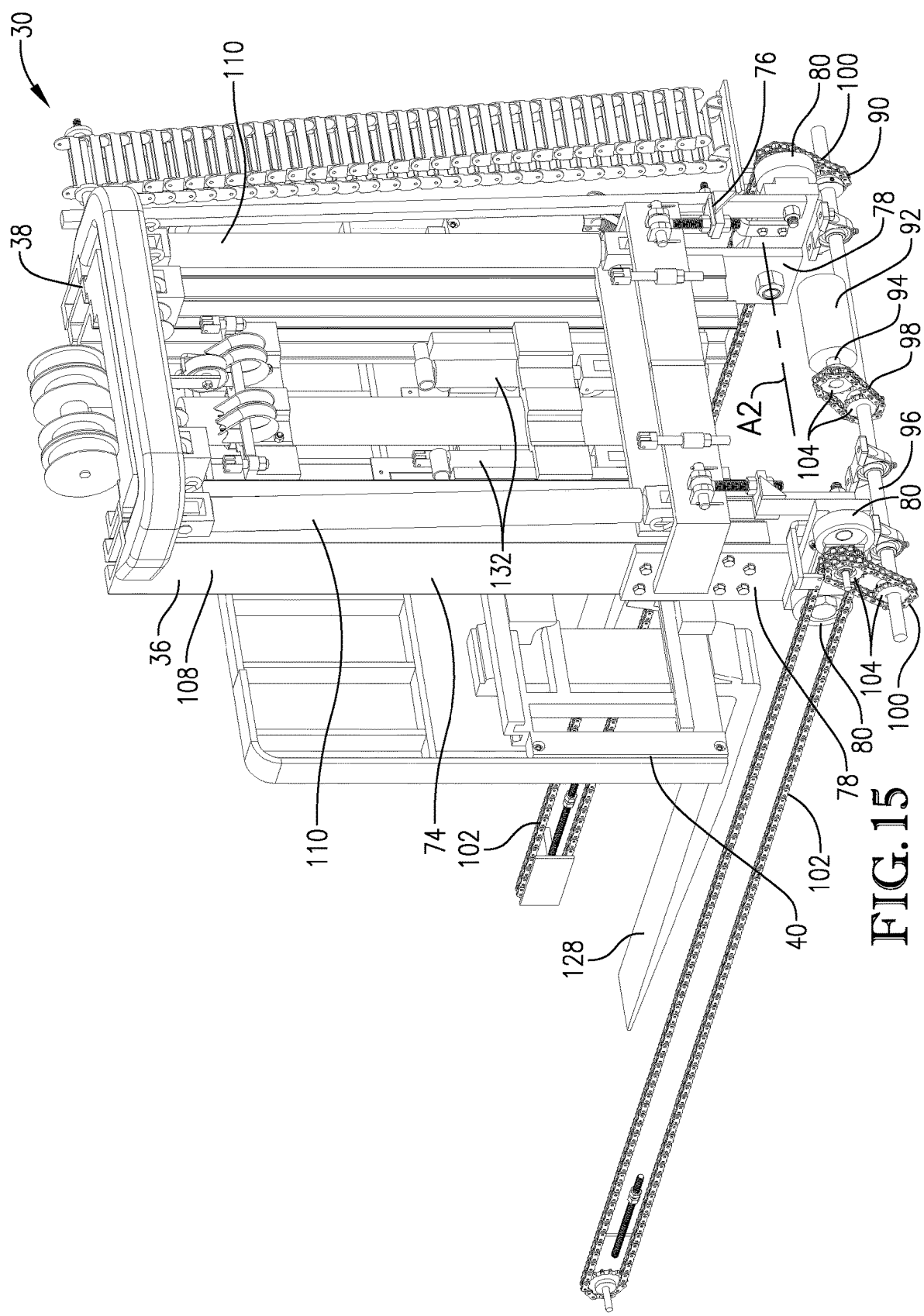
Figure 16:
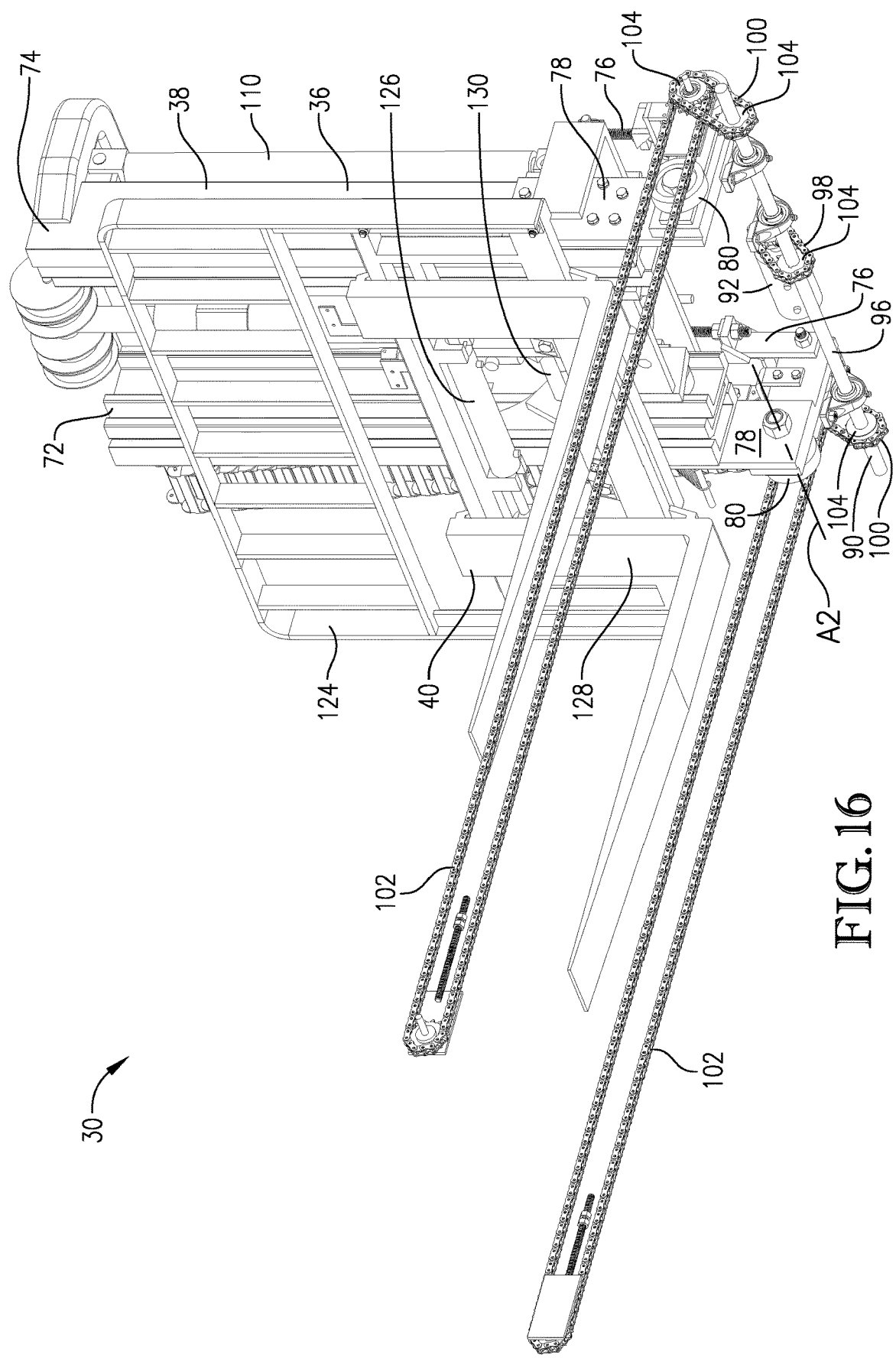
Figure 17:
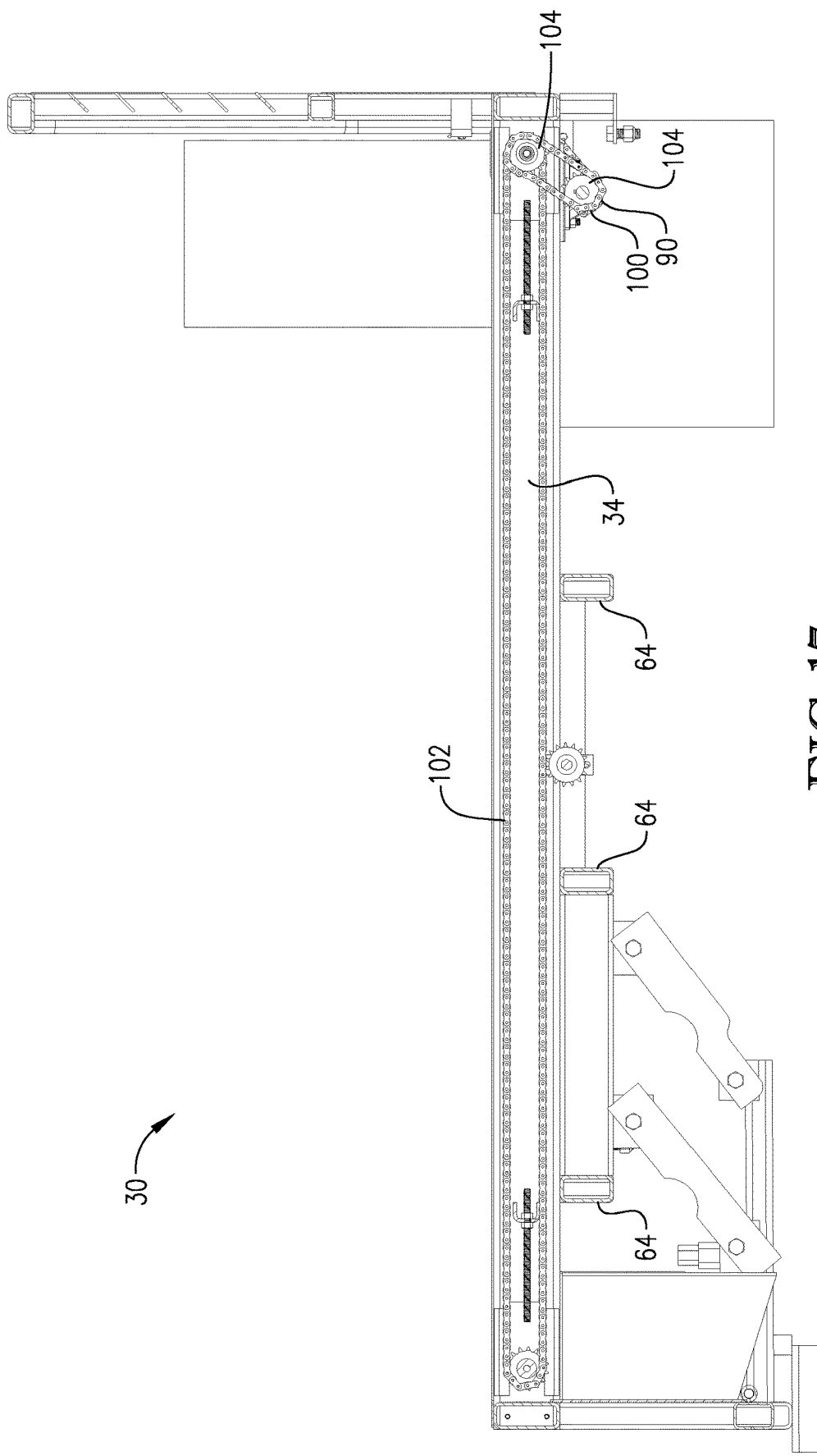
Figure 18:
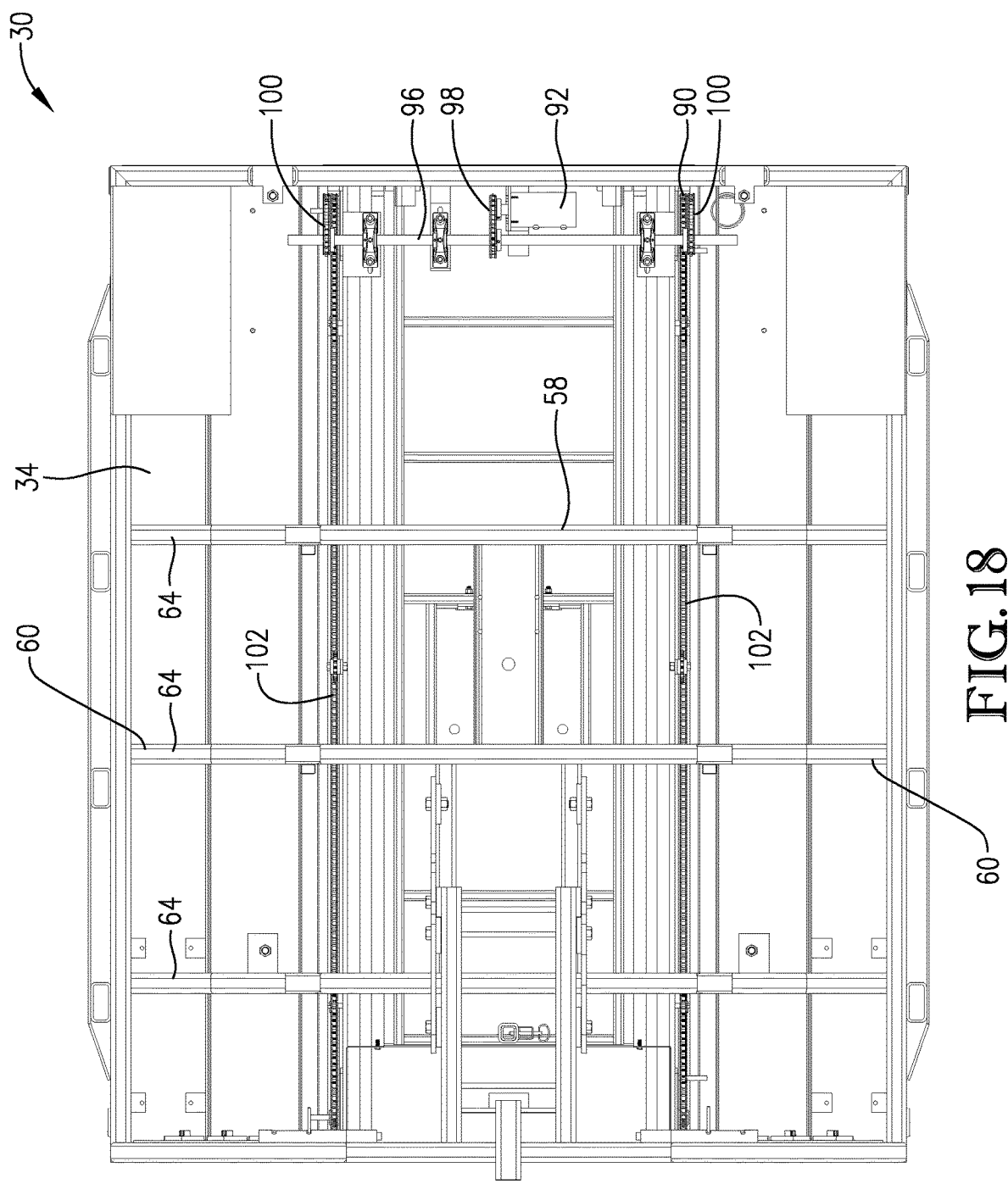

FIG. 10 is an upper rear perspective view of the vehicle and powered forklift assembly shown in FIGS. 1-6, with an upper bed plate being removed to depict a bed frame of the vehicle bed, with the bed frame including an inboard frame section and outboard frame sections that define a longitudinal channel to receive longitudinal forklift rails below the upper bed plate, and with the bed frame further including laterally-extending beams that cooperatively form the inboard and outboard frame sections;

FIG. 11 is a lower rear perspective view of the vehicle and powered forklift assembly shown in FIGS. 1-6 and 10, depicting the rolling chassis and power train of the vehicle, with the bed frame being supported on the chassis;

FIG. 12 is a fragmentary rear elevation of the powered forklift assembly shown in FIGS. 1-11, depicting the profile of the beams, with each beam including an inboard beam section associated with the inboard frame section and opposite outboard beam sections associated with the outboard frame sections;

FIG. 13 is a fragmentary rear perspective view of the powered forklift assembly shown in FIGS. 1-12, depicting the forklift shiftably supported by the forklift rails;

FIG. 14 is a fragmentary top perspective view of the powered forklift assembly shown in FIGS. 1-13, depicting a forklift mast including an outboard mast assembly and an inboard assembly with a lifting assembly and a lowering assembly;

FIG. 15 is a fragmentary front perspective view of the powered forklift assembly shown in FIGS. 1-14, depicting a drive motor, driven shaft, and drive chains of the forklift drive;

FIG. 16 is a fragmentary rear perspective view of the powered forklift assembly similar to FIG. 15, but showing the forklift drive from the opposite side;

FIG. 17 is a fragmentary side elevation view of the powered forklift assembly shown in FIGS. 1-16, depicting the forklift drive operably supported relative to the bed frame of the vehicle bed; and FIG. 18 is a fragmentary bottom view of the powered forklift assembly shown in FIGS. 1-17, depicting the forklift drive operably supported relative to the bed frame of the vehicle bed.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Turning to FIGS. 1-6, a powered forklift assembly 30 is operably mounted on an over-the-road powered vehicle 32 and is configured to shift a load L (see FIG. 3) relative to the vehicle 32. In particular, the forklift assembly 30 is operable to engage and shift the load L along a vertical direction and/or along a horizontal direction relative to the vehicle 32.

As will be explained, the forklift assembly 30 includes a vehicle bed 34 on which the load may be selectively received and placed for transportation during use.

It will be appreciated that a wide variety of loads may be engaged and supported by the forklift assembly 30. For instance, the forklift assembly 30 may support one or more pallets that carry one or more items for transport and/or storage. Other loads may include one or more containers (such as an intermediate bulk container, drum, barrel, box, tank, vat, trough, bag, etc.) that hold one or more items, such as bulk liquid material or bulk solid material. In yet other embodiments, loads (such as mechanical components, mechanical assemblies, or functional attachments) may be engaged directly by the forklift.

In various usage configurations, it will be understood that the load L carried by the forklift assembly 30 may be positioned at least partly above the forks. However, in at least some circumstances, it will also be appreciated that one or more loads may be secured at least partly (or entirely) below the forks.

The powered forklift assembly 30 preferably includes the vehicle bed 34 and a shiftable forklift 36. As will be explained further, the shiftable forklift 36 includes an extendable forklift mast 38 and a fork mechanism 40 that is operable to be vertically and laterally shifted by the forklift mast 38. The fork mechanism 40 is attached to and vertically shiftable relative to the forklift mast 38 to support the load L. The forklift mast 38 is shiftably supported by the vehicle bed 34 for transverse movement across the vehicle bed 34 along an operating path P, which extends longitudinally in a fore-and-aft direction (see FIG. 4). In particular, the shiftable forklift 36 is configured to be shifted longitudinally between a forwardmost position (see FIG. 1) and a rearmost transfer position (see FIG. 2). However, embodiments of the forklift assembly may also be configured so that the forklift may be shifted in a lateral direction from one side of the vehicle bed to the other.

Vehicle 32 preferably comprises an automobile in the form of a conventional pickup truck and includes a rolling chassis 42, cab 44, an engine (not shown), and a power train 46 (see FIG. 11). Rolling chassis 42 is elongated and defines a longitudinal vehicle axis. In the usual manner, rolling chassis 42 permits the vehicle 32 to be advanced in forward or rearward directions. More specifically, power train 46 transmits motive power from the engine to wheels 48 of the chassis 42. The preferred vehicle 32 is sized and configured to carry and transport the forklift assembly 30, along with any load supported by the forklift assembly 30. The depicted vehicle 32 is also operable to provide a power source for the forklift assembly 30.

Although the vehicle 32 has a preferred configuration, embodiments of the forklift assembly may be supported, transported, and/or powered by an alternative vehicle, such as an alternative truck (e.g., a semi-tractor truck or an industrial truck), an agricultural tractor, a wheeled trailer, etc. For at least certain aspects of the present invention, the forklift assembly may be supported on a non-wheeled chassis, frame, or skid.

Vehicle Bed

Turning to FIGS. 7-13, vehicle bed 34 preferably serves as a platform for shiftably supporting the forklift 36 and any load carried by the forklift 36 and is mounted on the chassis 42 of the vehicle 32. In the depicted embodiment, vehicle bed 34 includes a bed frame 50, forklift rails 52, and upper bed plate 54.

Vehicle bed 34 defines a longitudinal axis A1 (see FIG. 4) that is generally aligned with the longitudinal axis of the chassis 42 and associated with a forward direction of vehicle travel. The vehicle bed 34 is constructed so that an upper bed work surface 56 presented by the bed plate 54 is generally flat and provides a substantially continuous and uninterrupted surface. In preferred embodiments, the bed work surface 56 covers a sliding connection between the mast and the vehicle bed. The bed work surface 56 also preferably covers the powered forklift drive configured to shift the forklift longitudinally along the vehicle bed.

In more detail, the illustrated bed frame 50 includes an inboard frame section 58 and opposite outboard support sections (or wings) 60 (see FIGS. 10-13 and 18). Outboard support sections 60 cooperatively support the bed plate 54. The inboard frame section 58 is vertically recessed relative to the outboard support sections 60 so that the bed frame 50 defines a recessed channel 62 (see FIG. 12). The illustrated channel 62 is located at least partly below the outboard support sections 60 and above the inboard frame section 58. Preferably, the depicted channel 62 extends longitudinally and is generally aligned with the operating path P. However, the channel 62 may be alternatively oriented or otherwise positioned relative to the vehicle within the ambit of the present invention.

In more detail, inboard and outboard sections 58 and 60 are cooperatively formed by a series of laterally extending beams 64 (see FIGS. 10 and 18). Each of the depicted beams 64 has a unitary construction and includes an inboard beam section 66 and outboard beam sections 68 (see FIG. 12). Preferably, outboard beam section 68 includes inner and outer segments 68a, 68b, with the inner segment 68a extending at an oblique angle relative to the outer segment 68b (see FIG. 12). The inner segments 68a are preferably oriented so that the outer segments 68b are vertically offset from and spaced above respective inboard beam sections 58.

It is also within the scope of certain aspects of the present invention for the beams of the bed frame to be alternatively configured. For instance, beams may be alternatively oriented relative to the vehicle (e.g., associated with an alternative orientation of the operating path). In preferred embodiments, the inboard frame section 58 is mounted on the chassis 42 so that the inboard beam sections 66 rest on a chassis frame 70 of the chassis 42 (see FIGS. 2 and 3), although the bed frame may be alternative configured and/or positioned.

Again, the vehicle bed 34 also preferably includes the forklift rails 52, which slidably support the mast 38 (see FIGS. 10-12) and are configured to guide the forklift 36 along the operating path. As shown, the forklift rails 52 preferably extend longitudinally along substantially the entire fore-and-aft length of the vehicle bed 34 and are located in the channel 60 of the bed frame 50 and below the bed plate 54. The forklift rails 52 are preferably supported on the inboard frame section 58.

In the illustrated embodiment, forklift mast 38 includes inboard and outboard mast assemblies 72 and 74, along with adjustable forward and aft pairs of forklift mast assembly mounts 76 and 78 (see FIGS. 8, 15, and 16) attached to the outboard mast assembly 74. The forklift mast assembly mounts 76 and 78 are associated with rollers 80 (see FIGS. 12, 15, and 16) that are operably positioned in the respective rails 52 so that the rollers 80 shiftably support the forklift 36 and permit the forklift 36 to be advanced smoothly along the rails 52. Aft forklift mast assembly mounts 78 and rollers 80 cooperatively define a lateral tilt axis A2 that facilitates fore-and-aft tilting of the mast 38 (see FIGS. 15 and 16). In particular, forward forklift mast assembly mounts 76 include a threaded adjustment mechanism and are preferably adjustable (via threaded extension and retraction) to permit tilting of the mast 38 relative to the bed frame 50 about the lateral tilt axis A2. Adjustment of forklift mast assembly mounts 76 and 78 permits the mast 38 to be perpendicularly oriented relative to the top of the vehicle bed 34, bed frame 50, ground G, etc.

The illustrated vehicle bed 34 also preferably includes a retractable trailer hitch 82 (see FIG. 9), which includes a ball 84 supported on a receiver 86. When not in use, the hitch 82 can be stored within the channel 62 of the vehicle bed 34. The hitch 82 is accessible by opening a cover section 88 of the bed plate 54.

Turning to FIGS. 12-18, to facilitate shifting of the forklift 36 along the vehicle bed 34, the forklift assembly 30 also preferably includes a powered forklift drive 90 operably mounted as part of the vehicle bed 34. Forklift drive 90 preferably includes drive chains that are attached to the forklift mast 38 and configured to shift the forklift mast 38 along operating path P. Embodiments of the preferred forklift drive 90 comprise a chain drive that includes a hydraulic drive motor 92 with a drive shaft 94, a driven shaft 96, drive chain 98, and driven chains 100, 102 (see FIGS. 15 and 16).

The driven shaft 96 supports sprockets 104 drivingly connected to the drive chain 98 and driven chains 100, respectively (see FIGS. 15 and 16). The drive shaft 94 of the drive motor 92 also carries a sprocket 104 that engages the drive chain 98, so that rotation of the drive shaft 94 causes rotation of the driven shaft 96 and chains 100, 102. Each driven chain 102 is attached to a corresponding side of the forklift mast 38 and extends along the length of the operating path P.

In operation, drive motor 92 is operable to be powered so that the forklift drive 90 may shift the forklift 36 for transverse movement across the vehicle bed 34. As used herein, "transverse movement" of the forklift across the vehicle bed generally refers to front-to-back movement of the forklift and/or side-to-side movement of the forklift across the vehicle bed. Preferably, longitudinal shifting of the forklift 36 between the forwardmost position and rearmost transfer position occurs along the longitudinal axis. However, in at least some embodiments, lateral forklift shifting may occur in a lateral direction that extends orthogonally or obliquely to the longitudinal axis. As will be explained, the fork is configured to be raised or lowered when the forklift 36 is in the rearmost transfer position.

Although the forklift drive is preferably provided with a chain drive to move the forklift along the bed, the forklift drive may have alternative transmission elements. For instance, alternative embodiments may use a worm transmission having a worm that drivingly engages the mast and extends along the length of the operating path.

Embodiments of the forklift assembly may also include a downrigger (not shown) attached relative to the vehicle bed 34 to support the vehicle bed during operation. The downrigger may include an extendable arm attached to the vehicle bed and shiftable between extended and retracted positions. In the extended position, the downrigger is configured to engage the ground G for supporting the vehicle. In the retracted position, the downrigger is configured to be spaced above the ground (e.g., to permit advancement of the vehicle).

Shiftable Forklift Mast

Turning to FIGS. 5-14, the forklift mast 38 preferably includes inboard and outboard mast assemblies 72 and 74. The preferred inboard mast assembly 72 comprises a driven mast assembly that is vertically slidable relative to the outboard mast assembly 74 and includes a centrally-located lifting assembly 105 and a lowering assembly 106. As will be shown, the lifting and lowering assemblies 105 and 106 are operable to shiftably support the fork mechanism 40.

Embodiments of the outboard mast assembly 74 comprise a supporting mast assembly that serves as a base mast frame to support the assemblies 105 and 106 and is vertically stationary relative to the vehicle bed 34. The outboard mast assembly 74 includes a pair of opposed channel-shaped uprights 108 attached to the forklift mast assembly mounts 76 and 78. The mast assemblies 72 and 74 also preferably include chains and hydraulic hoses that are not depicted herein.

Outboard mast assembly 74 is preferably shiftably connected relative to the vehicle bed 34 for transverse movement relative thereto along the operating path P. Thus, the forklift 36 is shiftable along the operating path P into and out of a transfer position to transfer the load between the fork mechanism 40 and the bed work surface 56.

The lifting and lowering assemblies 105 and 106 are each extendable into and out of a retracted condition. When both the lifting and lowering assemblies 105 and 106 are retracted, the fork mechanism 40 is vertically located in an intermediate position (see FIGS. 1 and 2) where the fork mechanism 40 is generally positioned above the bed work surface 56. In this position, the forklift 36 may be shifted longitudinally along the length of the vehicle bed 34.

Lowering assembly 106 preferably includes lowering cylinders 110 and a lowering frame 112 with two (2) nested pairs of opposed channel-shaped uprights 114 (see FIGS. 14 and 15). The lowering frame 112 is slidable relative to the outboard mast assembly 74 and is shiftable into and out of a lowered position (see FIGS. 3 and 5) where at least part of the lowering assembly 106 and/or at least part of the fork mechanism 40 is located below the outboard mast assembly 74. More specifically, each pair of uprights 114 of the lowering frame 112 is downwardly extendable from the retracted position by driving the lowering cylinders 110 in an extension direction. Extension of the lowering frame 112 is configured to shift the lifting assembly 105 and fork mechanism 40 downwardly relative to the outboard mast assembly 74.

In a similar manner, the uprights 114 of the lowering frame 112 are upwardly retractable from a lowered position by driving the lowering cylinders 110 in a retraction direction. Retraction of the lowering frame 112 is configured to shift the lifting assembly 105 and fork mechanism 40 upwardly relative to the outboard mast assembly 74.

Lifting assembly 105 preferably includes a lifting cylinder 116 and a lifting roller assembly 118 with a carriage attachment 120 (see FIGS. 3 and 14) for pivotal coupling to the fork mechanism 40. The carriage attachment 120 of the lifting assembly 105 is slidable relative to the outboard mast assembly 74 and is shiftable into and out of an elevated position (see FIGS. 3 and 6) where at least part of the lifting assembly 105 is located above the outboard mast assembly 74.

Figure 1:
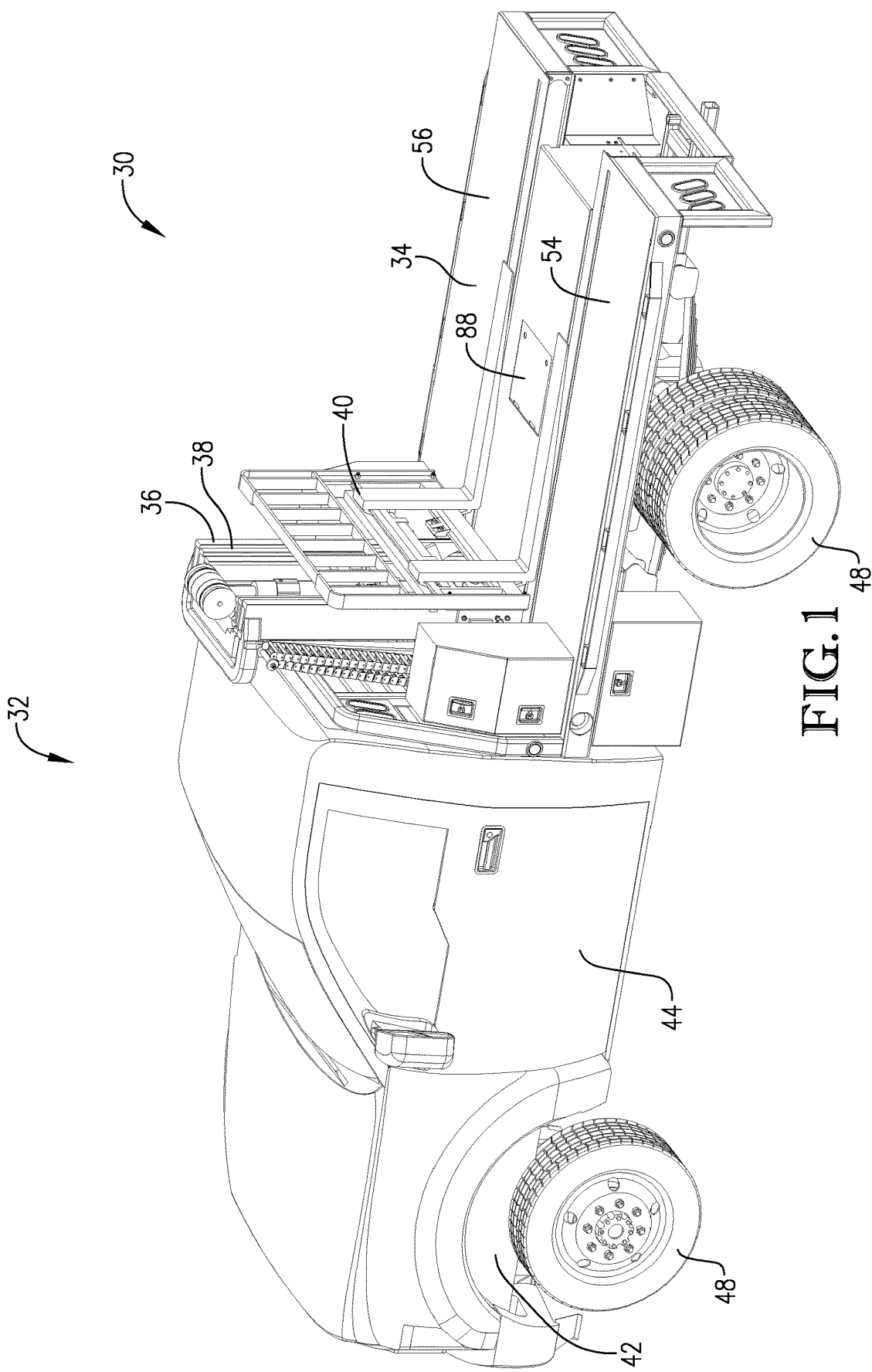
FIG. 1 is a perspective view of a vehicle and powered forklift assembly constructed in accordance with a preferred embodiment of the present invention, with the powered forklift assembly including a vehicle bed, a shiftable forklift, and a forklift drive, and depicting the forklift in a forward position on the vehicle bed.
Figure 2:
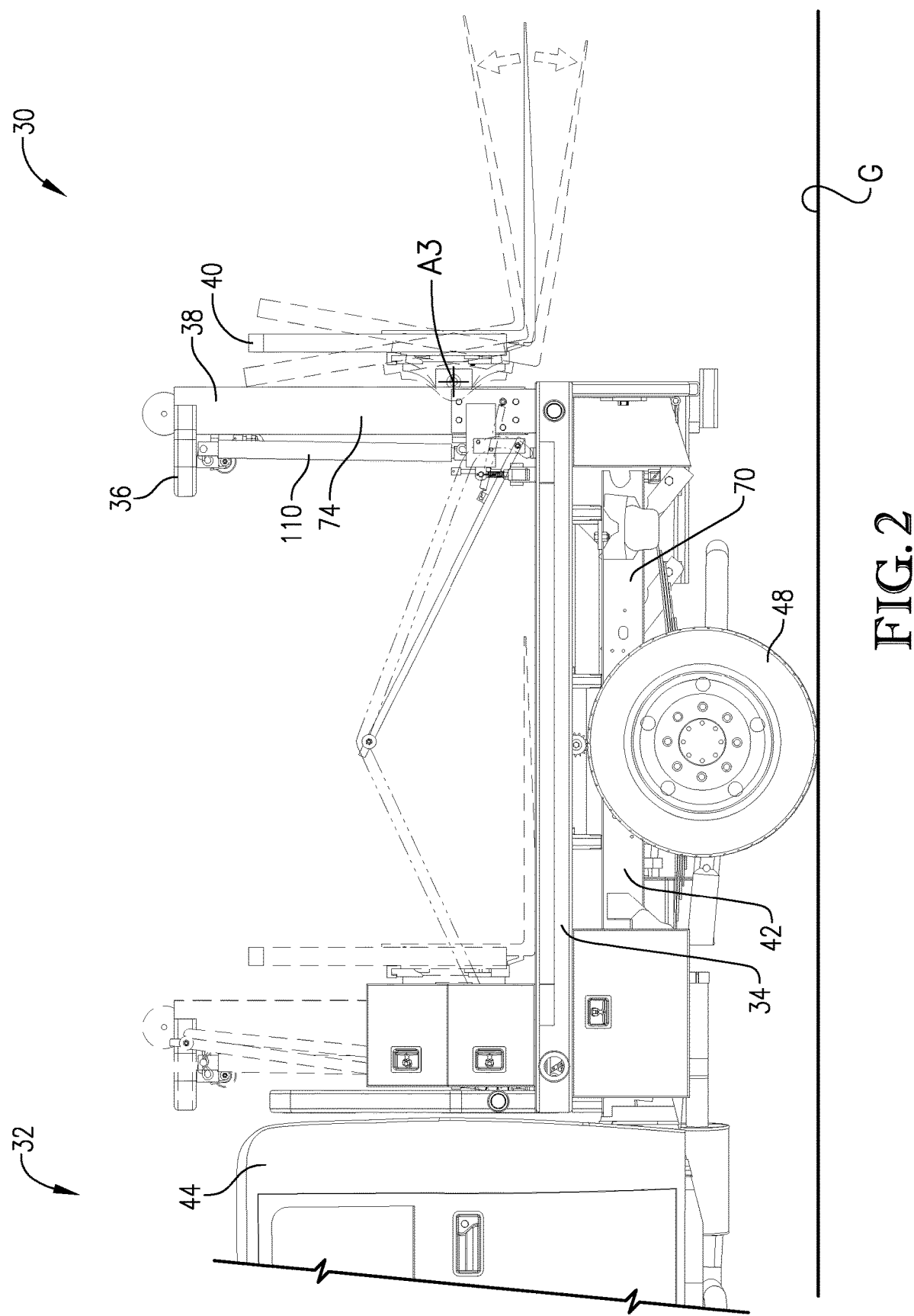
FIG. 2 is a fragmentary side elevation view of the vehicle and powered forklift assembly shown in FIG. 1, depicting the forklift shifted along the vehicle bed from the forward position to a rearward position, and further showing pivotal movement of a fork mechanism of the forklift about a lateral pivot axis.
Figure 3:
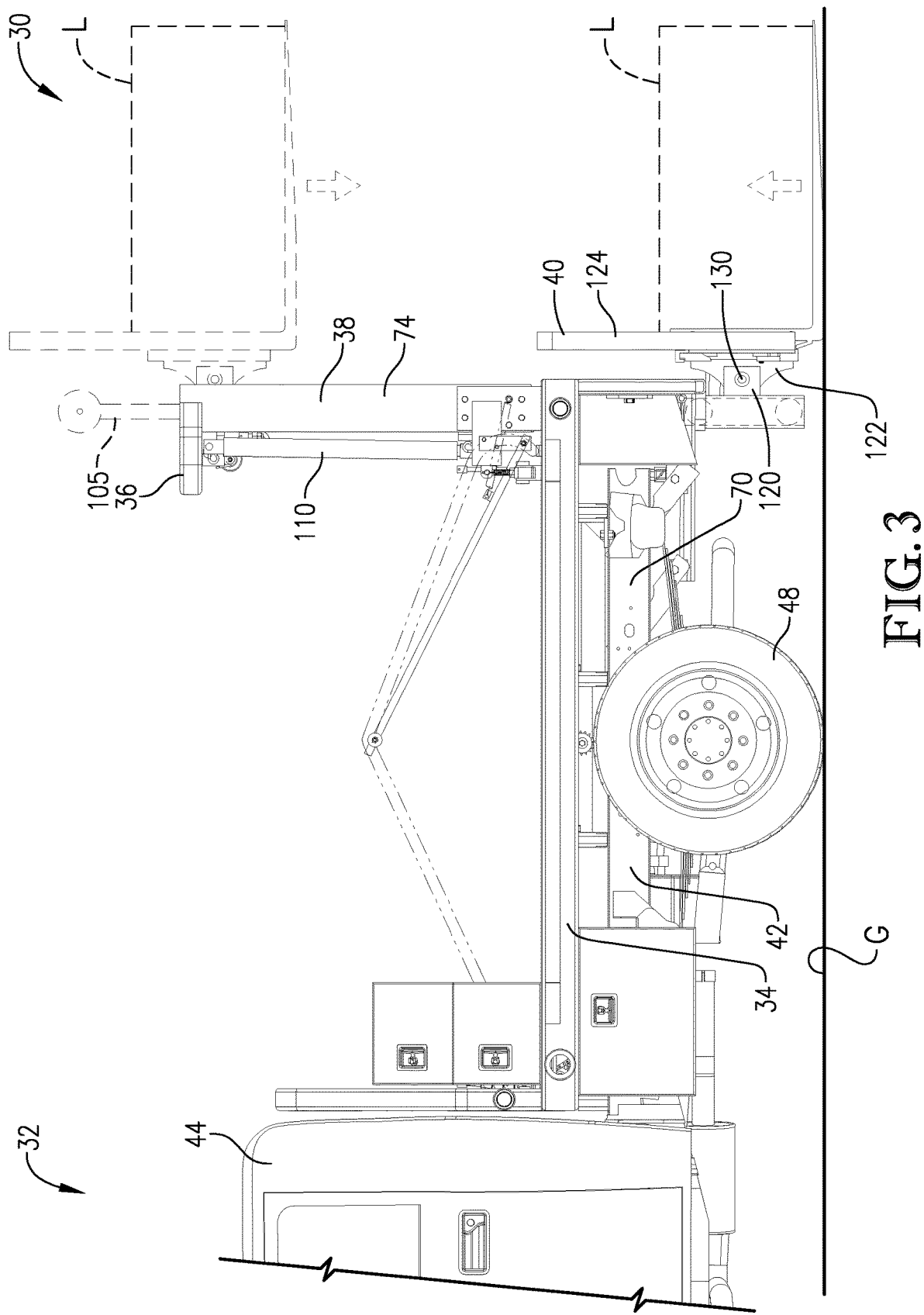
FIG. 3 is a fragmentary side elevation view of the vehicle and powered forklift assembly similar to FIG. 2, but showing the fork mechanism shifted between uppermost and lower most positions.
Figure 4:
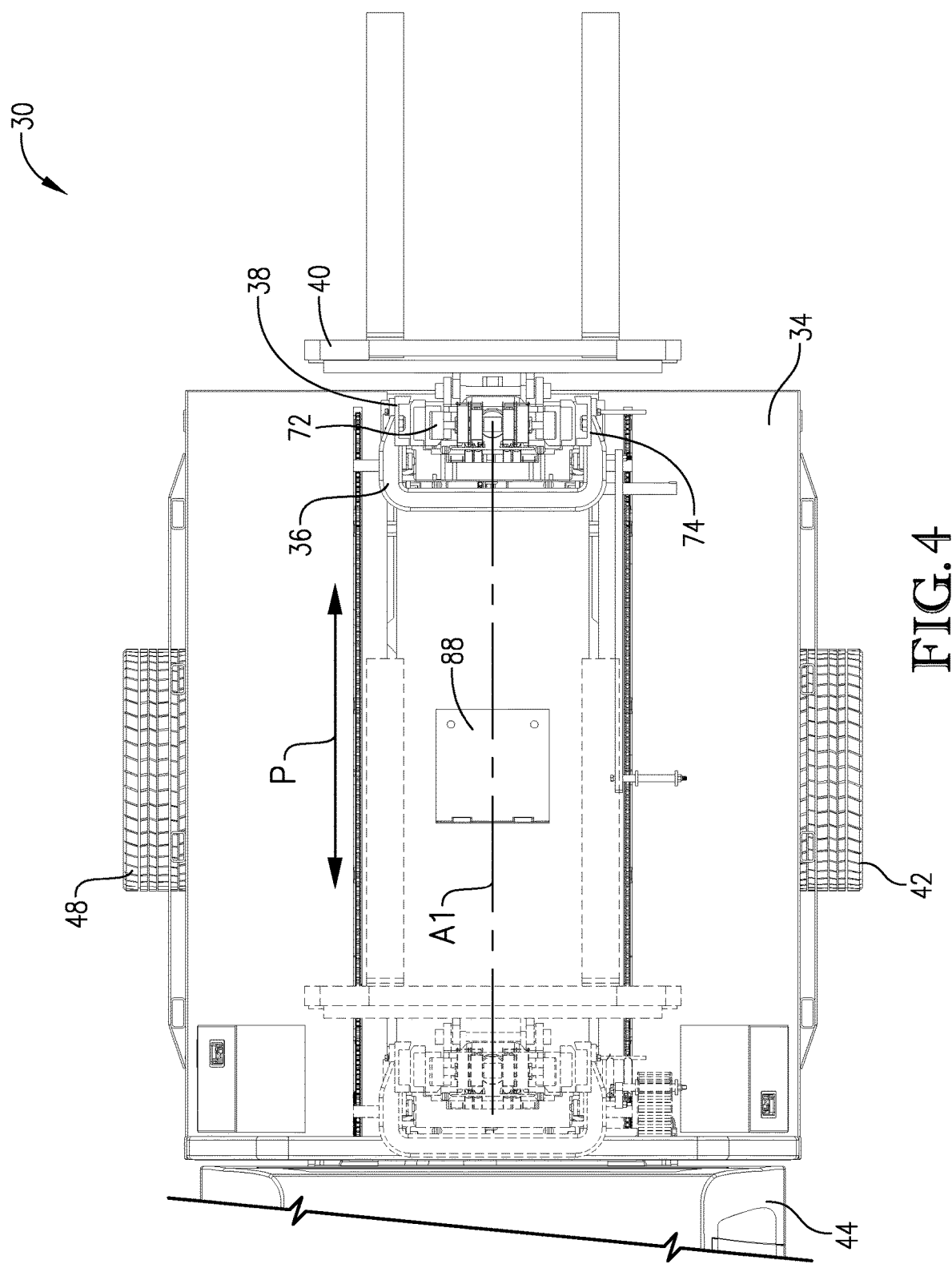
FIG. 4 is a fragmentary top plan view of the vehicle and powered forklift assembly shown in FIGS. 1-3, depicting the forklift in the rearward position.
Figure 5:
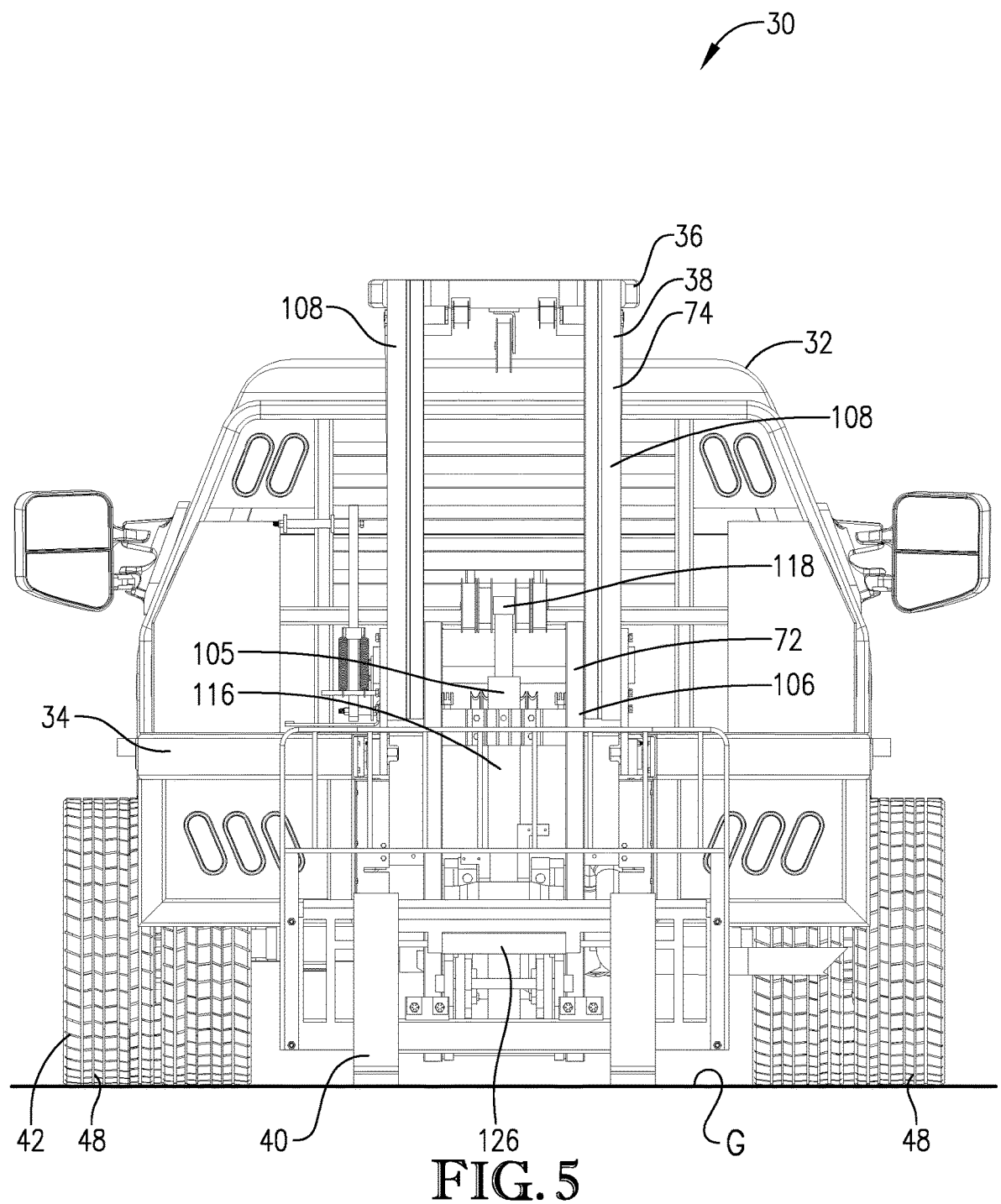
FIG. 5 is a rear elevation view of the vehicle and powered forklift assembly shown in FIGS. 1-4, depicting the fork mechanism in the lowermost position.
Figure 6:
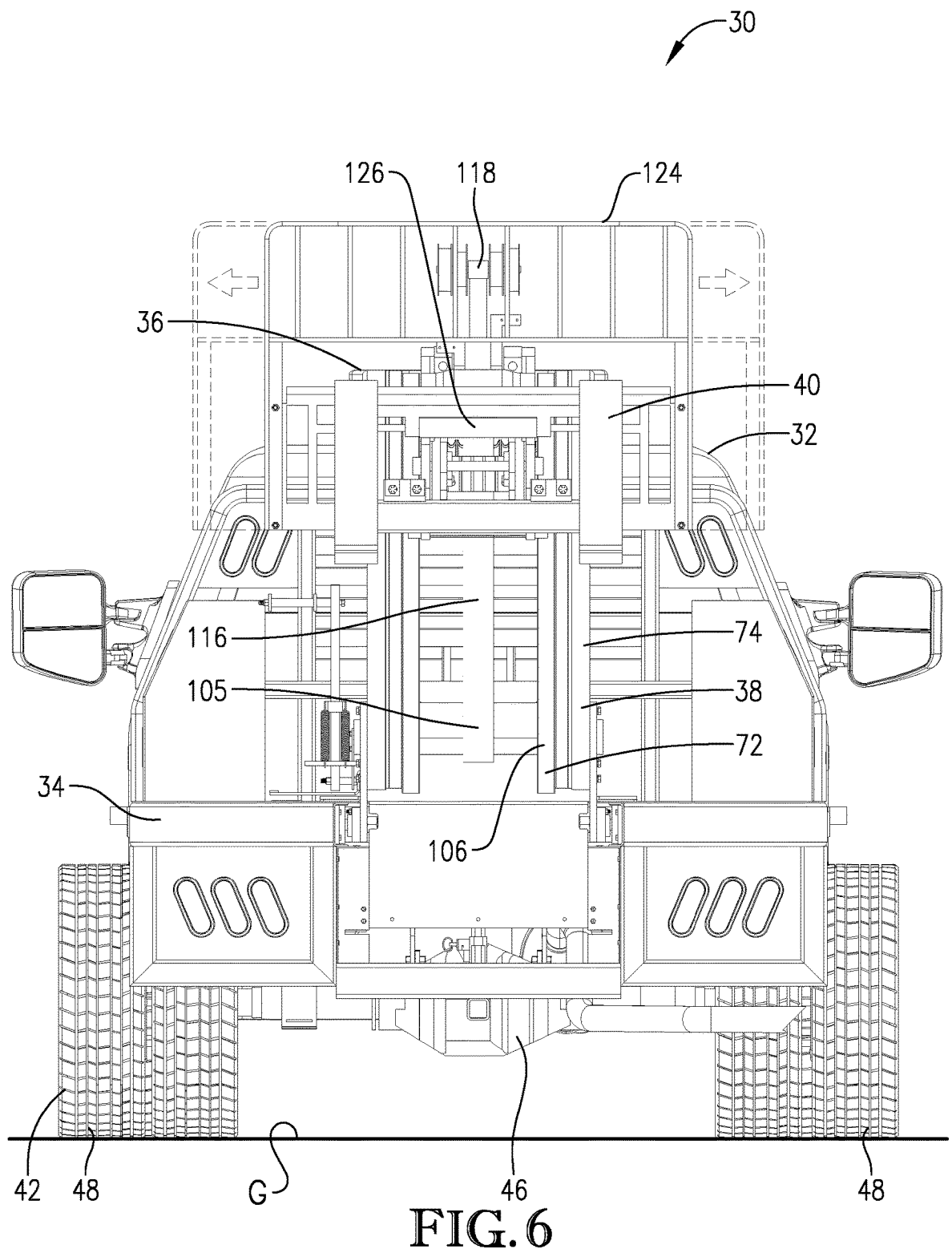
FIG. 6 is a rear elevation view of the vehicle and powered forklift assembly similar to FIG. 5, but showing the fork mechanism in the uppermost position.
Figure 7:
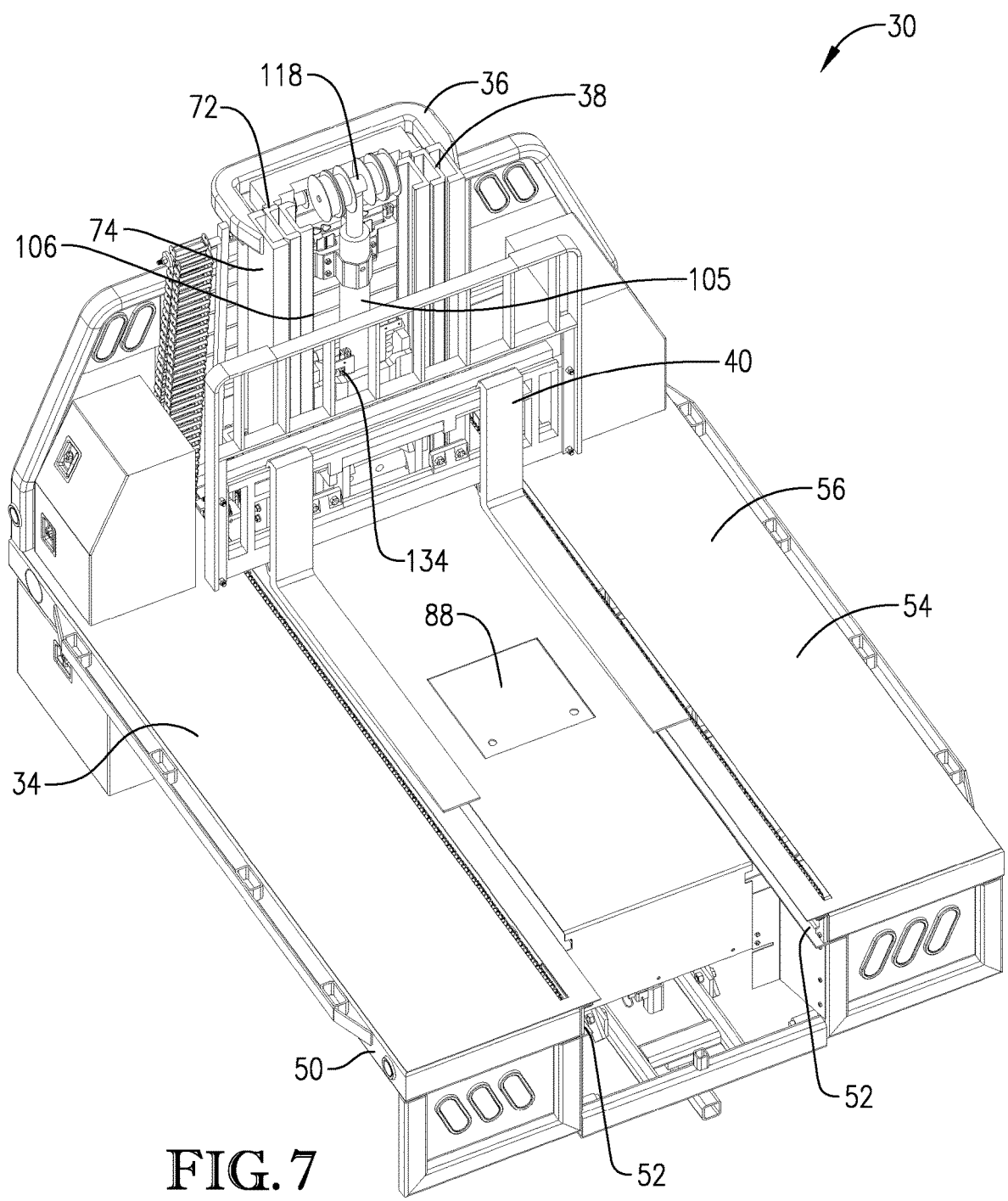
FIG. 7 is a rear perspective view of the powered forklift assembly shown in FIGS. 1-6, depicting the forklift in the forward position.
Figure 8:
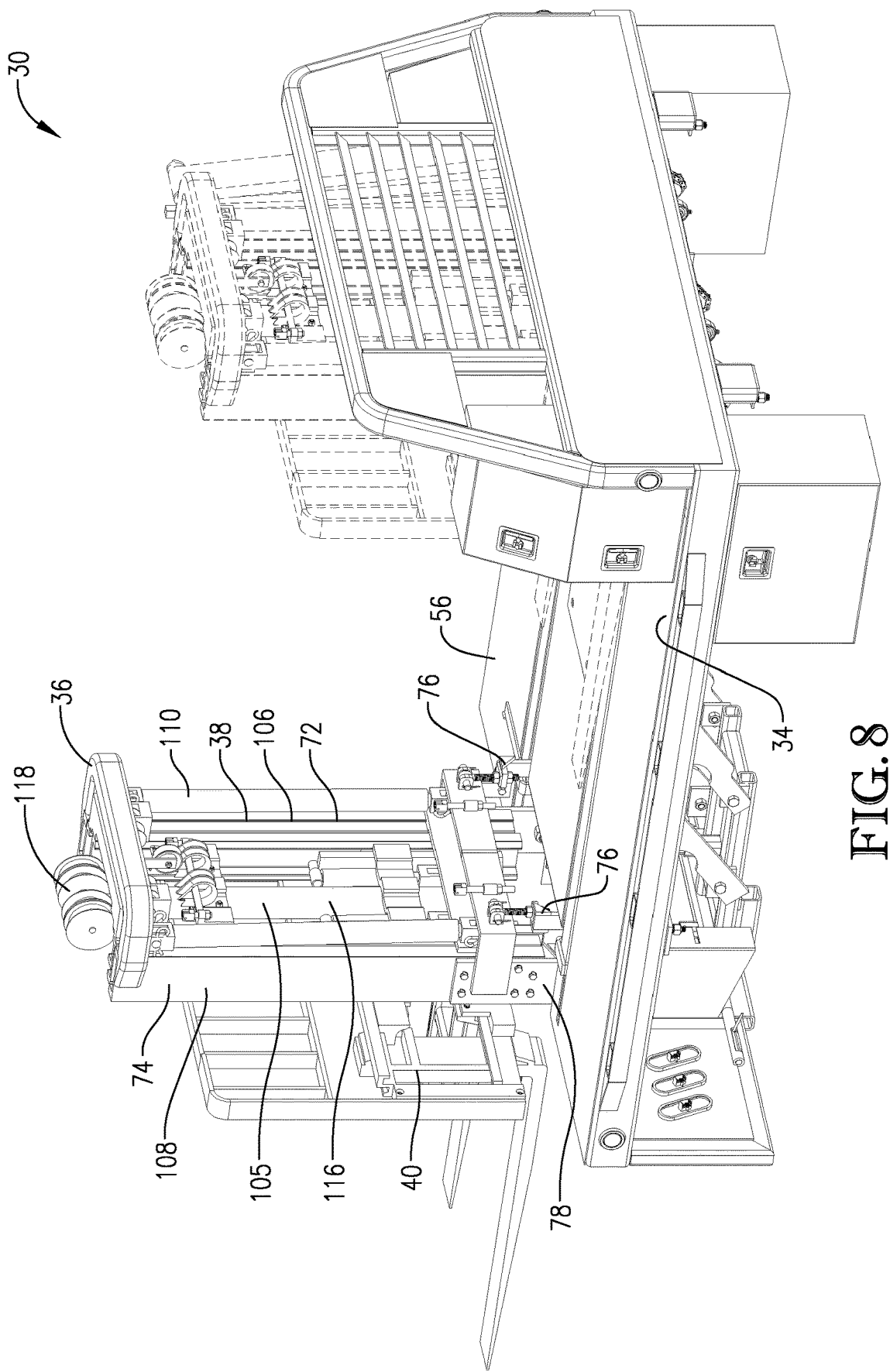
FIG. 8 is a front perspective view of the powered forklift assembly shown in FIGS. 1-7, depicting the forklift in the rearward position.
Figure 9:
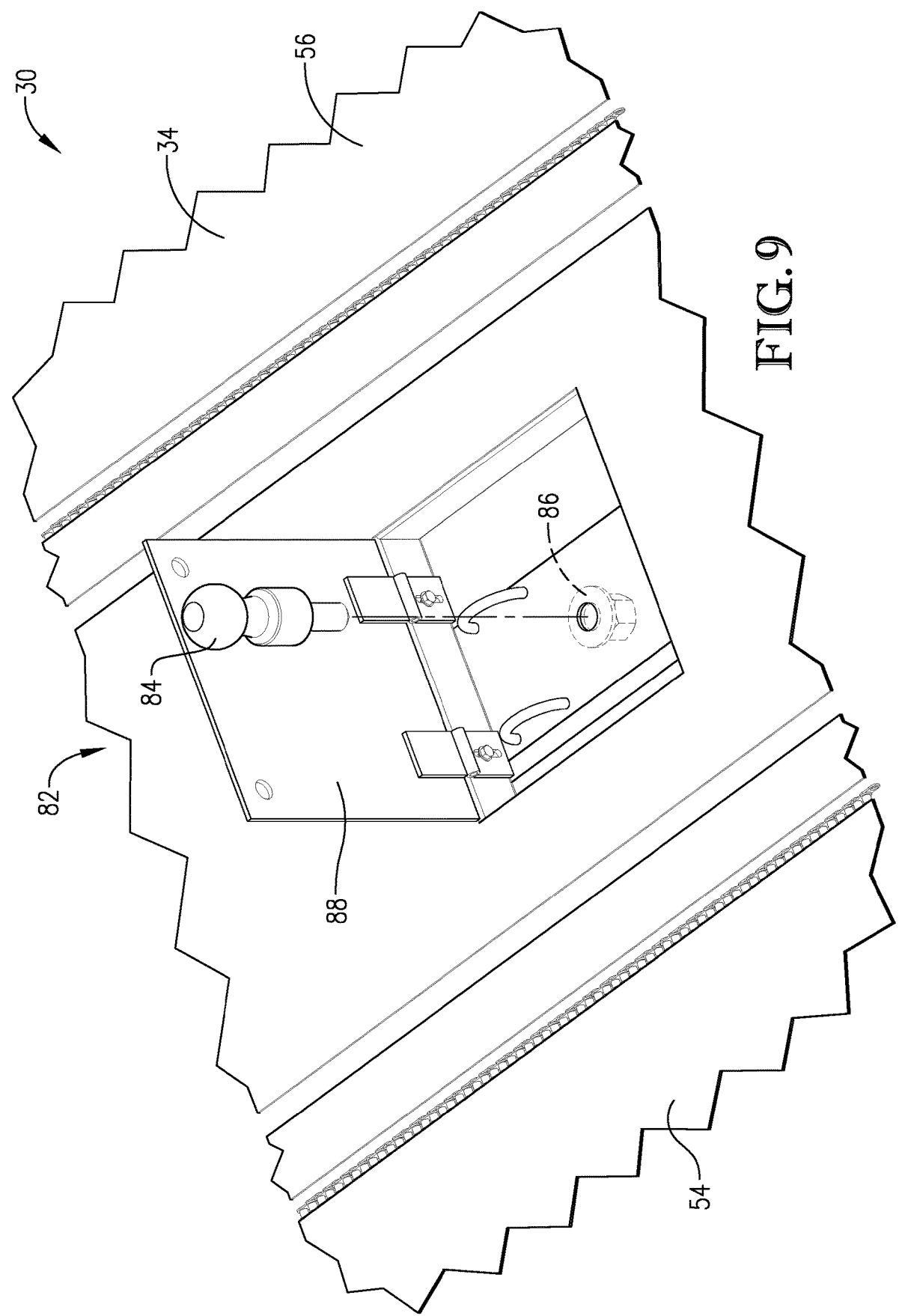
FIG. 9 is an enlarged fragmentary perspective view of the powered forklift assembly shown in FIGS. 1-8, depicting a cover section of the vehicle bed opened to provide access to a hitch located below the bed work surface.

The lifting roller assembly 118 is upwardly extendable from the retracted position by driving the lifting cylinder 116 in an extension direction (see FIGS. 3 and 6). Extension of the lifting roller assembly 118 is configured to shift the fork mechanism 40 upwardly relative to the outboard mast assembly 74.

Lifting roller assembly 118 is also downwardly retractable from an elevated position by driving the lifting cylinder 116 in a retraction direction. Retraction of the lifting roller assembly 118 is configured to shift the fork mechanism 40 downwardly relative to the outboard mast assembly 74.

In operation, fork mechanism 40 (see FIGS. 15 and 16) is configured to be raised or lowered when the forklift 36 is in the rearmost transfer position. For instance, when the forklift 36 is located in the rearmost position, cylinders 110 may be operated to lower the fork mechanism 40 downwardly from the intermediate position toward the lower position or raise the fork mechanism 50 toward the intermediate position. Conversely, when the forklift 36 is in the rearmost position, lifting cylinder 116 may be operated to raise the fork mechanism 40 upwardly from the intermediate position toward the upper position or lower the fork mechanism 40 toward the intermediate position.

Fork mechanism 40 is also configured to be raised or lowered by the lifting cylinder 116 when the forklift is in the forwardmost position or in a position longitudinally between the forwardmost and rearmost positions. For instance, lifting cylinder 116 may be operated to raise the fork mechanism 50 from the intermediate position toward the upper position or lower the fork mechanism 40 toward the intermediate position. When the forklift is located forwardly of the rearmost position, the cylinders 110 are generally restricted from lowering the fork mechanism 40 below the intermediate position because the vehicle bed 34 restricts downward shifting of the fork mechanism 40. However, it is within the scope of at least certain aspects of the present invention for the vehicle bed and/or forklift to be configured to permit downward shifting of the fork mechanism below the intermediate position when forklift is located forwardly of the rearmost position.

The forklift mast 38 is preferably oriented relative to the vehicle 32 so that the fork extends rearwardly from the forklift mast 38. However, for some aspects of the present invention, embodiments of the forklift mast may be alternatively oriented. For instance, the forklift mast may be arranged so that the fork extends laterally to one side of the vehicle or to the other side. Such a lateral orientation of the forklift mast and fork may be associated with a forklift operating path that extends laterally (instead of longitudinally) across the vehicle bed.

In at least some embodiments, the forklift mast may be supported to rotate about an upright axis. In alternative embodiments, the vehicle bed may be provided with a turntable (not shown) rotatably attached to the bed frame to rotate about an upright axis. Embodiments of the forklift mast may be attached to the turntable so that the mast and turntable are rotatable together about the upright axis.

Fork Mechanism

In the illustrated embodiment, the fork mechanism 40 is operably supported on the carriage attachment 120 of the lifting roller assembly 118 to support the load L and is vertically shiftable relative to the forklift mast 38 to correspondingly shift the load L. Fork mechanism 40 is also preferably configured to tilt the load L fore-and-aft and/or shift the load L in a lateral direction relative to the longitudinal axis. The depicted fork mechanism 40 preferably includes a pivotal support 122, upright backrest 124, backrest cylinder 126, and fork 128 (see FIGS. 3 and 14).

Pivotal support 122 is rotatably coupled to the carriage attachment 120 via a fork pivot 130 so that fork 128 may be pivoted up and down about a laterally extending pivot axis A3 (see FIGS. 2, 3, 12, and 14). In the illustrated embodiment, pivot axis A3 extends transversely to the longitudinal axis A1. It is also within the scope of at least certain aspects of the present invention for the fork pivot 130 to be alternatively oriented relative to the longitudinal axis (e.g., where the pivot axis extends obliquely or parallel to the longitudinal axis).

Pivot cylinders 132 of the forklift 36 are drivingly attached to the fork mechanism 40 and are configured to pivot the fork 128 about the lateral pivot axis A3 (see FIGS. 2, 3, 14, and 15). The illustrated construction enables the fork 128 to pivot relative to, and independently of, the forklift mast 38 about the lateral pivot axis A3.

Preferably, backrest 124 and fork 128 are slidably supported on the pivotal support 122 and are laterally slidable relative thereto. Backrest cylinder 126 is operably attached to the backrest 124 and is configured to drive the backrest 124 and fork 128 in opposite lateral directions (see FIG. 6). In this manner, the backrest 124 and fork 128 may be adjustably positioned in a lateral direction relative to the longitudinal axis.

The forklift assembly 30 also preferably includes a rear-facing camera 134 (see FIG. 7) supported on the backrest 124 of the fork mechanism 40. The camera 134 is positioned and configured for viewing the load L when the load L is received on the fork mechanism 40.

In operation, backrest 124 and fork 128 of the fork mechanism 40 are configured to be pivoted relative to the forklift mast 38 about the pivot axis A3 when the forklift 36 is in the rearmost transfer position by extending or retracting the cylinders 132. Further, backrest 124 and fork 128 are preferably configured to be shifted laterally by the backrest cylinder 126. Transverse movement of the backrest 124 and fork 128 across the vehicle bed 34 and pivoting of the fork mechanism 40 may be initiated simultaneously with each other or at different times.

In a similar manner, backrest 124 and fork 128 are also configured to be pivoted relative to the forklift mast 38 when the forklift 36 is in the forwardmost position or in a position longitudinally between the forwardmost and rearmost positions. However, when the forklift 36 is located forwardly of the rearmost position, the vehicle bed 34 may restrict at least some pivoting (particularly downward pivoting) of the fork mechanism 40 when the fork mechanism 40 is in the intermediate position. However, it is within the scope of at least certain aspects of the present invention for the vehicle bed and/or forklift to be configured to permit a full range of fork pivoting when forklift is located forwardly of the rearmost position. Also, when the forklift 36 is located forwardly of the rearmost position, backrest 124 and fork 128 may be shifted laterally by operating the backrest cylinder 126.

A user interface (not shown) of the forklift assembly 30 is operably associated with the camera 134 and the forklift 36. Preferably, the user interface includes a video display that operably communicates with the camera to display video data supplied by the camera. The user interface is configured to be located in the cab 44 of the vehicle 32, although the display may be used outside of the cab.

A user-operated controller (not shown) is associated with the forklift 36 and is configured to drive the forklift 36 relative to the vehicle bed 34. The controller includes a hydraulic manifold with valves that fluidly communicate with cylinders and motors of the forklift 36 (e.g., cylinders 110, 116, 126, 132 and 92) to selectively operate the forklift assembly 30. The controller also preferably includes a wireless interface with switches configured to actuate the valves and correspondingly operate the cylinders. The wireless interface is configured to be located in the operator cab of the vehicle, although the controller may be used outside of the cab.

As used herein, the term "includes" may refer to an item that includes something as a part thereof or is entirely made up of that something.

Directional references (e.g., top, bottom, front, back, side, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45°) angle relative to the axis but, because the element extends at least in part along the axis, it should still be considered axial. Similarly, the terms radial, radially, and variations thereof shall be interpreted to mean the element has at least some directional component in the radial direction relative to the axis.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A powered forklift assembly configured to be operably mounted on an over-the-road vehicle to shift a load relative to a chassis of the vehicle, said powered forklift assembly comprising:
   a shiftable forklift including an extendable mast and a fork mechanism,
   said fork mechanism being attached to and vertically shiftable relative to the mast and configured to support the load; and
   a vehicle bed supporting the forklift and configured to be mounted relative to the chassis of the vehicle, with the vehicle bed presenting a bed work surface for receiving the load,
   said mast being shiftably connected relative to the vehicle bed for transverse movement relative thereto along an operating path, with the forklift being shiftable along the operating path between a rear position and a forward position to transfer the load on and off of the bed work surface,
   said extendable mast including a supporting mast assembly and a driven mast assembly operable to support the fork mechanism,
   said supporting mast assembly being vertically stationary relative to the vehicle bed and said driven mast assembly being vertically slidable relative to the supporting mast assembly,
   said fork mechanism being attached to the driven mast assembly,
   said fork mechanism including an upright backrest and a fork extending away from the backrest in a longitudinal direction,
   said fork being pivotally attached relative to the mast and being pivotal independently of the mast about a lateral pivot axis extending transversely to the longitudinal direction,
   said forklift including a pivot cylinder attached relative to the fork and configured to pivot the fork about the lateral pivot axis.

2. The powered forklift assembly as claimed in claim 1, said vehicle bed including a bed frame with opposite outboard support sections and an inboard frame section between the support sections,
   said inboard frame section being vertically recessed relative to the support sections so that the bed frame defines a recessed channel at least partly below the outboard support sections and above the inboard frame section to receive part of the mast.

3. The powered forklift assembly as claimed in claim 2, said vehicle bed including a transversely extending bed plate that presents the bed work surface and is supported by the outboard support sections,
   said recessed channel extending below the bed plate.

4. The powered forklift assembly as claimed in claim 3, said vehicle bed including a forklift rail slidably engaging the mast and configured to guide the forklift along the operating path, with the forklift rail being located below the bed plate.

5. The powered forklift assembly as claimed in claim 3, said powered forklift assembly including a powered forklift drive attached to the mast and configured to shift the forklift along the operating path, with the forklift drive being located below the bed plate.

6. The powered forklift assembly as claimed in claim 2, said vehicle bed including a forklift rail slidably engaging the mast and configured to guide the forklift along the operating path, with the forklift rail being supported at least partly on the inboard frame section.

7. The powered forklift assembly as claimed in claim 2, said powered forklift assembly including a powered forklift drive attached to the mast and configured to shift the forklift along the operating path,
   said forklift drive including a chain drive extending along a length of the operating path, with the chain drive including a hydraulic motor and an endless chain powered by the motor.

8. The powered forklift assembly as claimed in claim 2,
said vehicle bed having a longitudinal axis associated with a forward direction of vehicle travel,
said operating path extending fore-and-aft along the longitudinal axis, with the vehicle bed including a forklift rail configured to guide the forklift along the operating path.

9. The powered forklift assembly as claimed in claim 1,
said driven mast assembly comprising a lifting assembly and a lowering assembly,
said lifting assembly being shiftable to an elevated position where at least part of the lifting assembly is located above the supporting mast assembly,
said lowering assembly being shiftable relative to the lifting assembly to a lowered position where at least part of the lowering assembly and/or at least part of the fork mechanism is located below the supporting mast assembly.

10. The powered forklift assembly as claimed in claim 9,
said lifting assembly including a lifting cylinder and a lifting roller assembly,
said lowering assembly including a lowering cylinder and a lowering frame,
said lowering cylinder configured to shift the lowering frame relative to the supporting mast assembly,
said lifting cylinder configured to shift the lifting roller assembly relative to the supporting mast assembly.

11. The powered forklift assembly as claimed in claim 1,
said vehicle bed including a forklift rail slidably engaging the supporting mast assembly and configured to guide the forklift along the operating path.

12. The powered forklift assembly as claimed in claim 1,
said supporting mast assembly being attached relative to the vehicle bed to restrict tilting of the mast relative to the vehicle bed about a lateral tilt axis.

13. The powered forklift assembly as claimed in claim 1,
said upright backrest being slidably attached to the driven mast assembly and slidable along a lateral sliding direction extending relative to the longitudinal direction.

14. The powered forklift assembly as claimed in claim 1,
said fork mechanism comprising a pair of rearwardly projecting fork elements configured to extend underneath and support the load.

15. The powered forklift assembly as claimed in claim 14,
said mast, when in the rear position, being configured to lower the fork elements at least down to a level of the ground on which the vehicle is supported.

16. The powered forklift assembly as claimed in claim 1,
said vehicle comprising a chassis that includes a pair of laterally-spaced longitudinally-extending rear frame members, said bed comprising a plurality of laterally-extending beams configured to extend across and be supported on said rear frame members of the chassis.

17. The powered forklift assembly as claimed in claim 16,
said bed further comprising a pair of longitudinally-extending forklift rails extending across and supported on the laterally extending beams,
said mast being supported by the forklift rails during movement of the mast along the operating path.

18. The powered forklift assembly as claimed in claim 17,
said bed further comprising an upper bed plate presenting at least a portion of the bed work surface,
said forklift rails being positioned at or below the bed work surface.

19. The powered forklift assembly as claimed in claim 1,
said vehicle bed including a bed frame with a frame section vertically recessed relative to an adjacent part of the bed frame so that the bed frame defines a recessed channel to receive part of the mast below the bed work surface.

20. A powered forklift assembly configured to be operably mounted on an over-the-road vehicle to shift a load relative to a chassis of the vehicle, said powered forklift assembly comprising:
a shiftable forklift including an extendable mast and a fork mechanism,
said fork mechanism being attached to and vertically shiftable relative to the mast and configured to support the load; and
a vehicle bed supporting the forklift and configured to be mounted relative to the chassis of the vehicle, with the vehicle bed presenting a bed work surface for receiving the load,
said fork mechanism including an upright backrest and a fork extending away from the backrest in a longitudinal direction,
said fork being pivotally attached relative to the mast and being pivotal independently of the mast about a lateral pivot axis extending transversely to the longitudinal direction,
said forklift including a pivot actuator configured to pivot the fork up and down about the lateral pivot axis.

21. The powered forklift assembly as claimed in claim 20,
said pivot actuator being a pivot cylinder.

22. The powered forklift assembly as claimed in claim 20,
said backrest being pivotally attached relative to the mast and being pivotal independently of the mast about the lateral pivot axis,
said pivot actuator being configured to simultaneously pivot both the backrest and the fork about the lateral pivot axis.

23. The powered forklift assembly as claimed in claim 20,
said backrest and said fork being laterally shiftable relative to said mast,
said fork mechanism comprising a backrest actuator for laterally shifting the backrest and the fork relative to the mast.

24. The powered forklift assembly as claimed in claim 20,
said backrest comprising an upper support member and a lower support member,
said fork comprising a pair of fork members,
each of said fork members being slidably coupled to each of the upper and lower support members so as to permit lateral sliding of the fork members relative to the upper and lower support members.

25. The powered forklift assembly as claimed in claim 24,
each of said fork members being L-shaped and comprising a rearwardly projecting fork element and an upwardly projecting fork element,
said upwardly projecting fork element being slidably coupled to the upper and lower support members.

26. A powered forklift assembly configured to be operably mounted on an over-the-road vehicle to shift a load relative to a chassis of the vehicle, said powered forklift assembly comprising:
a shiftable forklift including an extendable mast and a fork mechanism,
said fork mechanism being attached to and vertically shiftable relative to the mast and configured to support the load; and a vehicle bed supporting the forklift and configured to be mounted relative to the chassis of the vehicle, with the vehicle bed presenting a bed work surface for receiving the load, said extendable mast including a supporting mast assembly and a driven mast assembly operable to support the fork mechanism, said supporting mast assembly being vertically stationary relative to the vehicle bed and said driven mast assembly being vertically slidable relative to the supporting mast assembly, said driven mast assembly comprising a lowering assembly that is shiftable to a lowered position where at least part of the lifting assembly and/or at least part of the fork mechanism is located below the supporting mast assembly, said fork mechanism comprising a support and a fork, said fork being slidably supported on the support, said support comprising an upper support member and a lower support member, said fork comprising a pair of fork members, each of said fork members being L-shaped and comprising a rearwardly projecting fork element and an upwardly projecting fork element, said upwardly projecting fork element being slidably coupled to each of the upper and lower support members so as to permit lateral sliding of the fork members relative to the upper and lower support members.

27. A powered forklift assembly configured to be operably mounted on an over-the-road vehicle to shift a load relative to a chassis of the vehicle, said powered forklift assembly comprising:

a shiftable forklift including an extendable mast and a fork mechanism, said fork mechanism being attached to and vertically shiftable relative to the mast and configured to support the load; and a vehicle bed supporting the forklift and configured to be mounted relative to the chassis of the vehicle, with the vehicle bed presenting a bed work surface for receiving the load, said mast being shiftably connected relative to the vehicle bed for transverse movement relative thereto along an operating path, with the forklift being shiftable along the operating path between a rear position and a forward position to transfer the load on and off of the bed work surface, said fork mechanism comprising a support and a fork, said fork being slidably supported on the support, said support comprising an upper support member and a lower support member, said fork comprising a pair of fork members, each of said fork members being slidably coupled to each of the upper and lower support members so as to permit lateral sliding of the fork members relative to the upper and lower support members.

28. The powered forklift assembly as claimed in claim 27, each of said fork members being L-shaped and comprising a rearwardly projecting fork element and an upwardly projecting fork element, said upwardly projecting fork element being slidably coupled to the upper and lower support members.

29. The powered forklift assembly as claimed in claim 27, further comprising a fork tilt actuator for pivoting the fork members up and down relative to the mast on a lateral pivot axis.

* * * * *